US007682433B2

(12) United States Patent
Yanagimachi et al.

(10) Patent No.: US 7,682,433 B2
(45) Date of Patent: Mar. 23, 2010

(54) INK SET, INK JET RECORDING METHOD, INK CARTRIDGE, RECORDING UNIT, AND INK JET RECORDING APPARATUS

(75) Inventors: Satomi Yanagimachi, Yokosuka (JP); Kumiko Mafune, Kawasaki (JP); Mikio Sanada, Kawasaki (JP); Kenji Moribe, Fujisawa (JP); Tomonari Watanabe, Kawasaki (JP); Daiji Okamura, Yokohama (JP); Hideki Yamakami, Yokohama (JP); Satoshi Kudo, Kawasaki (JP); Fumiharu Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/116,336

(22) Filed: May 7, 2008

(65) Prior Publication Data

US 2008/0280042 A1   Nov. 13, 2008

(30) Foreign Application Priority Data

May 11, 2007  (JP)  ............................ 2007-126631
Apr. 23, 2008  (JP)  ............................ 2008-112757

(51) Int. Cl.
*C09D 11/02* (2006.01)
(52) U.S. Cl. .................. 106/31.6; 106/31.27
(58) Field of Classification Search ............. 106/31.6, 106/31.27
See application file for complete search history.

(56) References Cited

U.S. PATENT DOCUMENTS

| 4,723,129 A | 2/1988 | Endo et al. ............. 346/1.1 |
| 4,740,796 A | 4/1988 | Endo et al. ............. 346/1.1 |
| 5,078,790 A | 1/1992 | Tochihara et al. .......... 106/20 |
| 5,080,716 A | 1/1992 | Aoki et al. ............... 106/20 |
| 5,131,949 A | 7/1992 | Tochihara et al. .......... 106/20 |
| 5,132,700 A | 7/1992 | Tochihara et al. ......... 346/1.1 |
| 5,213,613 A | 5/1993 | Nagashima et al. ...... 106/20 R |
| 5,258,066 A | 11/1993 | Kobayashi et al. ...... 106/22 R |
| 5,296,022 A | 3/1994 | Kobayashi et al. ...... 106/20 D |
| 5,451,251 A | 9/1995 | Mafune et al. .......... 106/22 H |
| 5,466,282 A | 11/1995 | Eida et al. ............. 106/22 K |

(Continued)

FOREIGN PATENT DOCUMENTS

EP   1 085 062 A2   3/2001

(Continued)

OTHER PUBLICATIONS

Aug. 5, 2008 European Search Report in European Patent Appln. No. 08155982.5.

*Primary Examiner*—Jerry Lorengo
*Assistant Examiner*—Veronica Faison Gee
(74) *Attorney, Agent, or Firm*—Fitzpatrick, Cella, Harper & Scinto

(57) ABSTRACT

In an ink set having a plurality of inks, the ink set has at least a pigment ink and a dye ink. The pigment ink contains at least water, a surfactant, a self-dispersion pigment, and a poor medium for self-dispersion pigment and/or a salt; a dynamic surface tension of the pigment ink at a lifetime of 50 milliseconds is higher than 47 mN/m. The dye ink contains at least water, a surfactant and a dye. An ink set is provided which can obtain images having a high image density and a superior bleeding resistance without regard to the types of recording mediums.

14 Claims, 7 Drawing Sheets

U.S. PATENT DOCUMENTS

| | | | | |
|---|---|---|---|---|
| 5,571,313 | A | 11/1996 | Mafune et al. | 106/22 H |
| 5,911,815 | A | 6/1999 | Yamamoto et al. | 106/31.27 |
| 5,936,649 | A | 8/1999 | Ikeda et al. | 347/87 |
| 5,972,082 | A | 10/1999 | Koyano et al. | 106/31.27 |
| 6,027,210 | A | 2/2000 | Kurabayashi et al. | 347/100 |
| 6,062,674 | A | 5/2000 | Inui et al. | 347/43 |
| 6,174,354 | B1 | 1/2001 | Takizawa et al. | 106/31.43 |
| 6,221,141 | B1 | 4/2001 | Takada et al. | 106/31.6 |
| 6,231,652 | B1 | 5/2001 | Koyano et al. | 106/31.27 |
| 6,280,513 | B1 | 8/2001 | Osumi et al. | 106/31.6 |
| 6,332,919 | B2 | 12/2001 | Osumi et al. | 106/31.6 |
| 6,375,317 | B1 | 4/2002 | Osumi et al. | 347/100 |
| 6,412,936 | B1 | 7/2002 | Mafune et al. | 347/100 |
| 6,425,662 | B1 | 7/2002 | Teraoka et al. | 347/100 |
| 6,460,988 | B1 | 10/2002 | Mafune et al. | 347/100 |
| 6,506,239 | B1 | 1/2003 | Osumi et al. | 106/31.27 |
| 6,511,534 | B1 | 1/2003 | Mishina et al. | 106/31.33 |
| 6,521,034 | B1 | 2/2003 | Osumi et al. | 106/31.6 |
| 6,547,381 | B2 | 4/2003 | Watanabe et al. | 347/100 |
| 6,702,882 | B2 | 3/2004 | Yakushigawa et al. | 106/31.27 |
| 6,706,100 | B2 | 3/2004 | Mafune et al. | 106/31.27 |
| 6,706,104 | B2 | 3/2004 | Takuhara et al. | 106/31.6 |
| 6,706,105 | B2 | 3/2004 | Takada et al. | 106/31.6 |
| 6,843,839 | B2 | 1/2005 | Kanke et al. | 106/31.47 |
| 6,866,380 | B2 | 3/2005 | Yakushigawa et al. | 347/100 |
| 7,005,461 | B2 | 2/2006 | Sanada et al. | 523/160 |
| 7,037,362 | B2 | 5/2006 | Honma et al. | 106/31.13 |
| 7,141,107 | B2 | 11/2006 | Honma et al. | 106/31.58 |
| 7,144,452 | B2 | 12/2006 | Takayama et al. | 106/31.52 |
| 7,160,372 | B2 | 1/2007 | Yoshizawa et al. | 106/31.47 |
| 7,160,376 | B2 | 1/2007 | Watanabe et al. | 106/31.6 |
| 7,198,664 | B2 | 4/2007 | Mafune et al. | 106/31.28 |
| 7,198,665 | B2 | 4/2007 | Nakamura et al. | 106/31.52 |
| 7,201,791 | B2 | 4/2007 | Okamura et al. | 106/31.47 |
| 7,208,033 | B2 | 4/2007 | Kawabe et al. | 106/31.48 |
| 7,244,299 | B2 | 7/2007 | Tsuji et al. | 106/31.48 |
| 7,247,192 | B2 | 7/2007 | Ohira et al. | 106/31.27 |
| 7,247,194 | B2 | 7/2007 | Okamura et al. | 106/31.47 |
| 7,247,196 | B2 | 7/2007 | Sato et al. | 106/31.52 |
| 7,267,717 | B2 | 9/2007 | Watanabe et al. | 106/31.6 |
| 7,270,701 | B2 | 9/2007 | Jinnou et al. | 106/31.47 |
| 7,276,110 | B2 | 10/2007 | Tsujimura et al. | 106/31.27 |
| 7,276,112 | B2 | 10/2007 | Tokuda et al. | 106/31.6 |
| 7,297,197 | B2 | 11/2007 | Jinnou et al. | 106/31.47 |
| 7,347,890 | B2 | 3/2008 | Nito et al. | 106/31.27 |
| 7,371,274 | B2 | 5/2008 | Sanada et al. | 106/31.27 |
| 7,374,606 | B2 | 5/2008 | Sato et al. | 106/31.27 |
| 2002/0041316 | A1 | 4/2002 | Katsuragi et al. | 347/96 |
| 2005/0024458 | A1 | 2/2005 | Sanada et al. | 347/100 |
| 2006/0066699 | A1 | 3/2006 | Tokuda et al. | 347/100 |
| 2006/0089424 | A1 | 4/2006 | Sanada et al. | 523/160 |
| 2006/0098067 | A1 | 5/2006 | Imai et al. | 347/100 |
| 2006/0098068 | A1 | 5/2006 | Hakamada et al. | 347/100 |
| 2006/0103704 | A1 | 5/2006 | Hakamada et al. | 347/100 |
| 2006/0135647 | A1 | 6/2006 | Ichinose et al. | 523/160 |
| 2006/0192828 | A1 | 8/2006 | Ohira et al. | 347/100 |
| 2007/0097155 | A1 | 5/2007 | Imai et al. | 347/1 |
| 2007/0097156 | A1 | 5/2007 | Udagawa et al. | 347/1 |
| 2007/0112095 | A1 | 5/2007 | Moribe et al. | 523/160 |
| 2007/0148376 | A1 | 6/2007 | Tomioka et al. | 428/32.1 |
| 2007/0252868 | A1 | 11/2007 | Sanada et al. | 347/33 |
| 2007/0252881 | A1 | 11/2007 | Sanada et al. | 347/100 |
| 2008/0007606 | A1 | 1/2008 | Yanagimachi et al. | 347/100 |
| 2008/0018722 | A1 | 1/2008 | Mafune et al. | 347/100 |
| 2008/0106581 | A1 | 5/2008 | Sanada et al. | 347/86 |

FOREIGN PATENT DOCUMENTS

| | | |
|---|---|---|
| EP | 1 086 997 A2 | 3/2001 |
| EP | 1 188 804 A1 | 3/2002 |
| EP | 1 086 997 A3 | 1/2003 |
| EP | 1 085 062 A3 | 7/2003 |
| EP | 1 354 921 A2 | 10/2003 |
| EP | 1 354 921 A3 | 2/2004 |
| JP | 63-213581 | 9/1988 |
| JP | 2516218 | 4/1996 |
| JP | 9-296139 | 11/1997 |
| JP | 2000-63719 | 2/2000 |
| JP | 2000-198955 | 7/2000 |
| JP | 2002-167534 | 6/2002 |
| JP | 2003-231838 | 8/2003 |
| JP | 2003-238851 | 8/2003 |
| JP | 2004-83621 | 3/2004 |
| JP | 2004-143290 | 5/2004 |
| JP | 2005-200566 | 7/2005 |
| JP | 2005-206615 | 8/2005 |
| JP | 2006-63322 | 3/2006 |
| WO | WO 2005/097921 A1 | 10/2005 |

INK SET, INK JET RECORDING METHOD, INK CARTRIDGE, RECORDING UNIT, AND INK JET RECORDING APPARATUS

BACKGROUND OF THE INVENTION

1. Field of the Invention

This invention relates to an ink set, an ink jet recording method, an ink cartridge, a recording unit and an ink jet recording apparatus.

2. Description of the Related Art

In recent years, ink jet recording apparatus have become popular which carry both pigment inks and dye inks and are both achievable of sharply recording images of photographs or the like and sharply recording common documents, web pages, e-mails or the like on recording mediums such as plain paper mainly in monochrome modes. In order to attain a high image quality level when images are recorded on recording mediums such as plain paper by the use of an ink set having a pigment ink and a dye ink, it is demanded to use inks not only affording a high image density but also less causative of blurs. The use of inks less causative of blurs can keep the blurs from being caused at boundaries where images formed using a pigment ink and images formed using a dye ink adjoin one another, i.e., enables formation of images having superior bleeding resistance.

In general, in order to improve image density in images formed using pigment inks, the following are attempted. For example, in order to leave coloring materials on a recording medium in a larger quantity, it is attempted to control the permeability of inks into the recording medium, and, in order to secure a large area where the surface of a recording medium can be covered with coloring materials (the area being what is called an area factor), it is attempted to apply inks in a large quantity.

In such methods, however, it may take a time for the inks to dry, because the permeability of inks has been controlled or the inks are applied in a large quantity. Hence, when images are continuously recorded at a high speed, problems such as set-off may come about during continuous recording or the bleeding resistance may greatly lower. More specifically, during the time that recorded images formed on a second sheet after images have been formed on a first sheet are delivered out of an ink jet recording apparatus, inks of the recorded images on the first sheet may adhere to the back of the second-sheet recording medium because the inks of the images on the first sheet have not well dried (fixed). In addition, where images formed using a pigment ink and images formed using a dye ink form images adjoining one another, a phenomenon may remarkably occur in which the pigment ink blurs to the dye ink, to cause a lowering of the bleeding resistance.

In order to improve the bleeding resistance, it is also attempted to, e.g., improve the permeability of inks into a recording medium to keep the inks from blurring. In this method, however, the coloring materials may less remain on the recording medium to achieve no sufficient image density.

Thus, the improvement in image density and the improvement in bleeding resistance stand a relationship of trade-off each other in many cases. In order to resolve such problems together, studies have hitherto been made on various techniques as stated below. For example, proposals are made on a technique in which the composition of the pigment ink is designed so as to make coloring materials highly associative or aggregative (see Japanese Patent Applications Laid-open No. 2000-198955, No. 2005-206615, No. 2002-167534 and No. 2004-143290). A proposal is also made on a technique in which a pigment ink is reacted with a reaction fluid containing a specific compound, so as to accelerate the aggregation of a pigment (see Japanese Patent Application Laid-open No. 2000-63719). Proposals are still also made on a technique in which the physical properties of a pigment ink are specified so as to control the permeation or blurring of the pigment ink (see Japanese Patent No. 2516218 and Japanese Patent Applications Laid-open No. 2003-238851, No. 2005-200566 and No. 2003-231838). Proposals are still also made on a technique in which the physical properties of a dye ink are specified so as to control the permeation or blurring of the dye ink (see Japanese Patent Applications Laid-open No. S63-213581, No. 2004-83621 and No. H09-296139). A proposal is further made on a technique in which the relationship of physical properties between a plurality of inks is specified so as to control the permeation or blurring of these inks (see Japanese Patent Application Laid-open No. 2006-63322). The background arts enumerated above are further discussed below.

As the technique in which the composition of the pigment ink is designed so as to make coloring materials highly associative or aggregative, a proposal as reported below is made. For example, an ink containing a self-dispersion type carbon black and a specific salt are used so as to achieve improvements in image density and bleeding resistance (see Japanese Patent Application Laid-open No. 2000-198955). In this technique, the pigment present in the ink in a dispersed state is forcedly aggregated on the surface of a recording medium so that the pigment can be kept from permeating into the recording medium, to achieve higher image density and bleeding resistance on images obtained using a conventional pigment ink. In this technique, however, pigment particles are made to aggregate on the surface of the recording medium, and hence the area where the recording medium surface can be covered with coloring materials (what is called "area factor") may be insufficient as compared with the volume of ink droplets.

To cope with such a problem, a proposal as reported below is made. For example, a proposal is made on that an ink containing a plurality of water-soluble organic solvents and a water-insoluble coloring material is made up as described below, so as to make the coloring material aggregate effectively in the vicinity of the surface of a recording medium even though ink droplets have a small volume, to achieve a sufficient image density (see Japanese Patent Application Laid-open No. 2005-206615). Stated specifically, it is an ink so made up that the plurality of water-soluble organic solvents are a good medium and a poor medium, for a self-dispersion pigment, and a water-soluble organic solvent which shows the maximum Ka value among the respective Ka values of the plurality of water-soluble organic solvents as determined by the Bristow method is the poor medium.

In respect of changes in particle size of a pigment or dispersion stability of the pigment at the time a pigment ink containing water or a water-soluble organic solvent is evaporated, a proposal as reported below is made. For example, a proposal is made on that the increase rate of the average particle size of the pigment is controlled to be 25% or less in a pigment ink 30% by mass of which has been evaporated (see Japanese Patent Application Laid-open No. 2002-167534). A proposal is further made on an ink achievable of dispersion stability even though 50% by mass of a pigment ink has been evaporated (see Japanese Patent Application Laid-open No. 2004-143290).

As the technique in which a pigment ink is allowed to react with a reaction fluid containing a specific compound, so as to accelerate the aggregation of a pigment, a proposal as reported below is made. For example, a proposal is made on that an ink containing a pigment, fine polymer particles, a water-soluble organic compound and water and an aqueous solution containing a polyhydric metal salt are applied to a recording medium and these ink and solution are allowed to react with each other on the recording medium so as to form images with a high quality level (see Japanese Patent Application Laid-open No. 2000-63719).

As the technique in which the physical properties of a pigment ink are specified so as to control the permeation or blurring of the pigment ink, a proposal is made which takes note of dynamic surface tension of ink. For example, a proposal is made on that an ink having been set to be [dynamic surface tension (dyne/cm) at lifetime of 0 millisecond+viscosity (cp)] 42 to 49 can be an ink having superior drying performance (see Japanese Patent No. 2516218). A proposal is also made on an ink in which the maximum value of the rate of change in dynamic surface tension with time is controlled to be from 0.2 mN/m/s or more to 0.4 mN/m/s or less (see Japanese Patent Application Laid-open No. 2003-238851). A proposal is further made on an ink in which the dynamic surface tension (dyne/cm) at a lifetime of 10 milliseconds is from 25 to 50 mN/m and the difference in dynamic surface tension between the maximum value and the minimum value is 5 mN/m or less (see Japanese Patent Application Laid-open No. 2005-200566). A proposal is still further made on an ink in which the dry viscosity is 100 mPa·s or less, the dynamic surface tension (dyne/cm) at a lifetime of 10 milliseconds is 45 mN/m or more and the dynamic surface tension (dyne/cm) at a lifetime of 1,000 milliseconds is 35 mN/m or less (see, e.g., Japanese Patent Application Laid-open No. 2003-231838).

As the technique in which the physical properties of a dye ink are specified so as to control the permeation or blurring of the dye ink, a proposal is made which takes note of static surface tension (what is called "surface tension") of the ink and dynamic surface tension of the ink. As to the former, a proposal is made on that the surface tension of ink at 20° C. is controlled to be 45 mN/m or more so as to make small the area per one dot the ink forms, to keep the ink from blurring on a recording medium (see Japanese Patent Application Laid-open No. S63-213581). A proposal is also made on that the surface tension of ink is controlled to be 40 mN/m or more so as to keep the ink from blurring (see Japanese Patent Application Laid-open No. 2004-83621). As to the latter, a proposal is made on that the surface tension of ink at an air-bubble period T (second/air bubble) of $\leq 0.2$ is controlled to be 40 mN/m or more so as to keep the ink from blurring, and the surface tension at T>1 is controlled to be less than 50 mN/m so as to improve the ink in its ejection reliability (see Japanese Patent Application Laid-open No. H09-296139). In the above Japanese Patent Application Laid-open No. 2003-231838, it is also disclosed that the dynamic surface tension at a lifetime of 10 milliseconds is controlled to be 45 mN/m or more so as to keep the ink from blurring and the dynamic surface tension at a lifetime of 1,000 milliseconds is controlled to be 35 mN/m or less so as to improve the ink in its quick-drying performance.

As the technique in which the relationship of physical properties between a plurality of inks are specified so as to control the permeation or blurring of these inks, a proposal as reported below is made. For example, a proposal is made which takes note of the relationship of dynamic surface tension in a plurality of inks making up an ink set (see Japanese Patent Application Laid-open No. 2006-63322). More specifically, in an ink set consisting of a black ink, a yellow ink, a magenta ink and a cyan ink, the dynamic surface tension of each ink in the same lifetime within the range of lifetimes of from 30 milliseconds to 1,000 milliseconds at a temperature of 25° C. as measured by a maximum bubble pressure method is specified in the following way: (1) The yellow ink has a higher dynamic surface tension than the black ink. (2) The difference in dynamic surface tension between the yellow ink and the black ink is 5 mN/m or less. (3) The difference in dynamic surface tension between the yellow ink and the magenta ink and the difference in dynamic surface tension between the yellow ink and the cyan ink are both 3 mN/m or more. (4) The magenta ink and cyan ink each have a lower dynamic surface tension than the black ink. It is disclosed that specifying the dynamic surface tension in these ways brings an improvement in bleeding resistance.

The present inventors have investigated advantages and problems any conventional inks have had, and have analyzed characteristic features of images obtained using such inks. As the result, they have found that the rate at which the ink permeates into a recording medium after an ink having been ejected out of a recording head has adhered to the recording medium and the manner of a change in condition (aggregation) of the ink differs depending on the type of the recording medium. Here, the rate at which the ink permeates into the recording medium refers not to the rate at which it diffuses through the interior of the recording medium, but to the rate at which the ink comes not to exist on the surface of the recording medium after the ink has been applied to the recording medium.

That is, the background arts for achieving a high image density have mainly aimed to control the state of a coloring material. Accordingly, where an ink the coloring material of which aggregates concurrently as the ink permeates into the recording medium is applied to a recording medium having a high ink permeation rate, the coloring material may insufficiently come to aggregate during the time the ink permeates into the recording medium, and hence no sufficient image density has been achievable in some cases. Besides, where images are formed in which regions of images formed using a pigment ink and regions of images formed using a dye ink adjoin one another, the pigment may insufficiently come to aggregate during the time the pigment ink permeates into the recording medium, to tend to come into contact with the dye ink, and hence bleeding has occurred in some cases.

To cope with such a problem, it is attempted as in the above Japanese Patent Application Laid-open No. 2005-206615 to bring a water-insoluble coloring material and a plurality of water-soluble organic solvents into a specific relationship, stated specifically, to use as a poor medium for the water-insoluble coloring material a water-soluble organic solvent having the maximum Ka value determined by the Bristow method. This makes the coloring material diffuse and aggregate effectively in the vicinity of the surface of a recording medium even though ink droplets have a small volume, to achieve sufficient image density and bleeding resistance, as so reported. In this technique, however, after the ink has been applied to the recording medium, the coloring material is made to aggregate while it is made to diffuse in the vicinity of the surface of the recording medium. Hence, any coloring material that has not come to aggregate at the time the coloring material begins to diffuse permeates into the recording medium in its thickness direction. As the result, in a recording medium having a high ink permeation rate, it has sometimes come about that any high image density is not obtainable and the bleeding can not be kept from occurring. This means that, where in a recording medium it differs in surface state or in wettability to inks, the ink differs greatly in its permeation rate and diffusion rate to the recording medium. Then, when images are formed on such a recording medium having a high ink permeation rate, the aggregation of the coloring material comes not to catch up the permeation and diffusion of the ink, so that the coloring material in the ink permeates into the recording medium in its thickness direction. As the result, depending on the type of the recording medium, the problems may come about such that no sufficient image density and bleeding resistance are achievable.

In both the above Japanese Patent Applications Laid-open No. 2002-167534 and No. 2004-143290, what is taken into account is limited only to how the pigment in the pigment ink behaves after its dispersion has come to stable regions or dispersion has become unstable until it begins to aggregate, and is insufficient for well improving the image density and the bleeding resistance. In the above Japanese Patent Application Laid-open No. 2000-63719, a pigment ink and an aqueous solution containing a polyhydric metal salt are allowed to react with each other on the recording medium. However, components making up an ink and recording systems are demanded to be more simplified. That is, it is demanded that inks are made less dependent on external factors so as to keep the inks from the difficulty of a lowering of reliability or the like that is caused by complex action, to provide inks in which coloring materials, water-soluble organic compounds and so forth have appropriately be designed.

As in the above Japanese Patent No. 2516218 and Japanese Patent Applications Laid-open No. 2003-238851, No. 2005-200566 and No. 2003-231838, some proposals are made on inks taking not of dynamic surface tension. All of these techniques, however, do not at all take account of what changes in condition the coloring material has caused in the course that the ink comes to permeate after it has been applied to the recording medium. That is, in the techniques disclosed in Japanese Patent No. 2516218 and Japanese Patent Applications Laid-open No. 2003-238851, No. 2005-200566 and No. 2003-231838, the phenomenon being taken place in the recording medium is not taken into account, and hence any high image density and bleeding resistance the present inventors seek are not achievable by merely specifying ink physical properties as in these publications. For example, in the ink disclosed in Japanese Patent No. 2516218, the value is specified that is found by adding the values of dynamic surface tension at a lifetime of 0 millisecond and viscosity. In the inks disclosed in Japanese Patent Applications Laid-open No. 2003-238851, No. 2005-200566 and No. 2003-231838, the dynamic surface tension at a lifetime of 10 millisecond and the value at which the dynamic surface tension changes are specified. Accordingly, the present inventors have prepared an ink which satisfies the conditions disclosed in Japanese Patent No. 2516218 and Japanese Patent Applications Laid-open No. 2003-238851, No. 2005-200566 and No. 2003-231838, and have studied image density and bleeding resistance brought by such an ink. However, it has been found unable to achieve any image density and bleeding resistance at the level the present inventors have sought. This is because the ink does little come to evaporate at the lifetime of 0 millisecond or 10 milliseconds, and the ink has not come to change in condition to such an extent as to enhance image density and bleeding resistance on the recording medium. That is, the techniques disclosed in Japanese Patent No. 2516218 and Japanese Patent Applications Laid-open No. 2003-238851, No. 2005-200566 and No. 2003-231838 do not at all take account of the changes in condition of ink on the recording medium, and hence the dynamic surface tension at the lifetime of 0 millisecond or 10 milliseconds can be said to be a value having no significance at all in regard to how the image density and bleeding resistance be improved.

In addition, the value [dynamic surface tension (dyne/cm) at lifetime of 0 millisecond+viscosity (cp)]=42 to 49 in the above Japanese Patent No. 2516218 is too low to keep the ink from permeating into, in particular, a recording medium with coarse fiber and many voids. Similarly, the value that the dynamic surface tension at a lifetime of 10 milliseconds is 45 mN/m as in the above Japanese Patent Application Laid-open No. 2003-231838 is also too low to keep the ink from permeating into, in particular, such a recording medium with coarse fiber and many voids. From these points as well, the techniques disclosed in Japanese Patent No. 2516218 and Japanese Patent Application Laid-open No. 2003-231838 can be said to be unable to improve the image density and the bleeding resistance.

In the case when the images are formed in which images formed using a pigment ink and images formed using a dye ink adjoin one another, it is considered that the dye ink blurs so greatly as to tend to come into contact with the pigment ink, to cause bleeding. Accordingly, in respect of the bleeding resistance, it is important not only to control aggregative properties, blurring and permeation of the pigment ink, but also to take an approach from the dye ink.

However, in the dye ink as well, like the technique disclosed in Japanese Patent Application Laid-open No. S63-213581 or No. 2004-83621, it may be unable to control the blurring by merely making the ink have a high surface tension. This is because, if the ink continues to have a high surface tension for a long time, the permeation of ink into the recording medium does not proceed, so that the ink may spread on the surface of the recording medium. In addition, if the dye ink is made to have a high surface tension, it can not wet the surface of the recording medium uniformly, and hence the uniformity of colors in images may lower. Besides, if the ink is made to have a high static surface tension, the ink comes less permeable into the recording medium, and hence it may take a long time until the ink permeates completely into the recording medium, so that ink set-off or the like may occur.

In the techniques disclosed in Japanese Patent Applications Laid-open No. 2003-231838 and No. H09-296139, it is attempted to control blurring and permeation, taking note of the dynamic surface tension at a lifetime of 10 milliseconds and changes in the dynamic surface tension. However, studies made by the present inventors have revealed that any bleeding resistance at the level the present inventors seek is not achievable at least by specifying the dynamic surface tension as disclosed in the above Japanese Patent Applications Laid-open No. 2003-231838 and No. H09-296139. This is presumed due to the fact that the ink has little come to evaporate, or permeate into the recording medium at its surface regions, at least at the lifetime of 10 milliseconds and the dot area has not been made controllable even by specifying the value of dynamic surface tension at the lifetime of 10 milliseconds. That is, in the techniques disclosed in Japanese Patent Applications Laid-open No. 2003-231838 and No. H09-296139, the changes in condition in ink on the recording medium is not taken into account, thus the dynamic surface tension at a lifetime of 10 milliseconds can be said to be a value having no significance at all in regard to how the blurring be controlled and how the bleeding resistance be improved.

Further, in the technique disclosed in Japanese Patent Application Laid-open No. 2006-63322, the relationship of dynamic surface tension within the range of lifetimes of from 30 milliseconds to 1,000 milliseconds between a black ink and color inks is specified. Stated specifically, the dynamic surface tension of a yellow ink and a black ink each in the same lifetime within the range of lifetimes of from 30 milliseconds to 1,000 milliseconds is so specified that the yellow ink has a higher dynamic surface tension than the black ink. In virtue of this, when these inks come into contact with each other on the recording medium, the permeation of the yellow ink is pulled by the permeation of the black ink, where images formed using the black ink are color-mixed with the yellow ink, greatly different in color value, and this can keep the bleeding from occurring, as so reported. Accordingly, the present inventors have prepared an ink which satisfies the requirements disclosed in Japanese Patent Application Laid-open No. 2006-63322, and have studied image density and bleeding resistance in images formed by applying to a recording medium the ink obtained. As the result, it has been found that any image density and bleeding resistance at the level the present inventors seek is not achievable. As to the reason therefor, the present inventors consider it as stated below. Relatively large voids are present in a large number in plain paper, and hence, as the inks are applied to make the surface of plain paper wet, the inks are taken into the voids, where the movement of the inks is restricted to a certain extent. Hence, the influence the relationship of physical properties in a plurality of inks has on the bleeding resistance is limitative. In an ink set made up of a plurality of inks, in order to control the bleeding, it is a very important factor to appropriately determine the wettability of each ink to plain paper and the extent of blurring in the above each ink. That is, the bleeding can not be controlled by merely specifying the relationship of dynamic surface tensions in a plurality of inks making up the ink set as in the case of Japanese Patent Application Laid-open No. 2006-63322.

SUMMARY OF THE INVENTION

Accordingly, an object of the present invention is to provide an ink set that can obtain images having a high image density and a superior bleeding resistance without regard to the types of recording mediums. Other objects of the present invention are to provide an ink jet recording method, an ink cartridge, a recording unit and an ink jet recording apparatus which make use of such an ink set.

The above objects are achieved by the present invention described below. More specifically, the ink set according to the present invention is an ink set having a plurality of inks, and is characterized in that; the ink set has at least a pigment ink and a dye ink; the pigment ink contains at least water, a surfactant, a self-dispersion pigment, and at least one of a poor medium for self-dispersion pigment and a salt (a poor medium for self-dispersion pigment and/or a salt); a dynamic surface tension of the pigment ink at a lifetime of 50 milliseconds is higher than 47 mN/m; and the dye ink contains at least water, a surfactant and a dye.

The ink jet recording method according to a form of the present invention is an ink jet recording method in which inks are ejected by an ink jet method, wherein the inks are the pigment ink and the dye ink which constitute the above ink set.

The ink cartridge according to another form of the present invention is an ink cartridge having ink storing portions which store inks therein, wherein the inks stored in the ink storing portions are the pigment ink and the dye ink which constitute the above ink set.

The recording unit according to still another form of the present invention is a recording unit having ink storing portions which store inks therein and a recording head which ejects the inks therefrom, wherein the inks stored in the ink storing portions are the pigment ink and the dye ink which constitute the above ink set.

The ink jet recording apparatus according to a further form of the present invention is an ink jet recording apparatus having ink storing portions which store inks therein and a recording head which ejects the inks therefrom, wherein the inks stored in the ink storing portions are the pigment ink and the dye ink which constitute the above ink set.

According to the present invention, it can provide an ink set that can obtain images having a high image density and a superior bleeding resistance without regard to the types of recording mediums. According to other forms of the present invention, the present invention can provide an ink jet recording method, an ink cartridge, a recording unit and an ink jet recording apparatus which make use of such an ink set.

Further features of the present invention will become apparent from the following description of exemplary embodiments with reference to the accompanying drawings.

DESCRIPTION OF THE EMBODIMENTS

Figure 1:
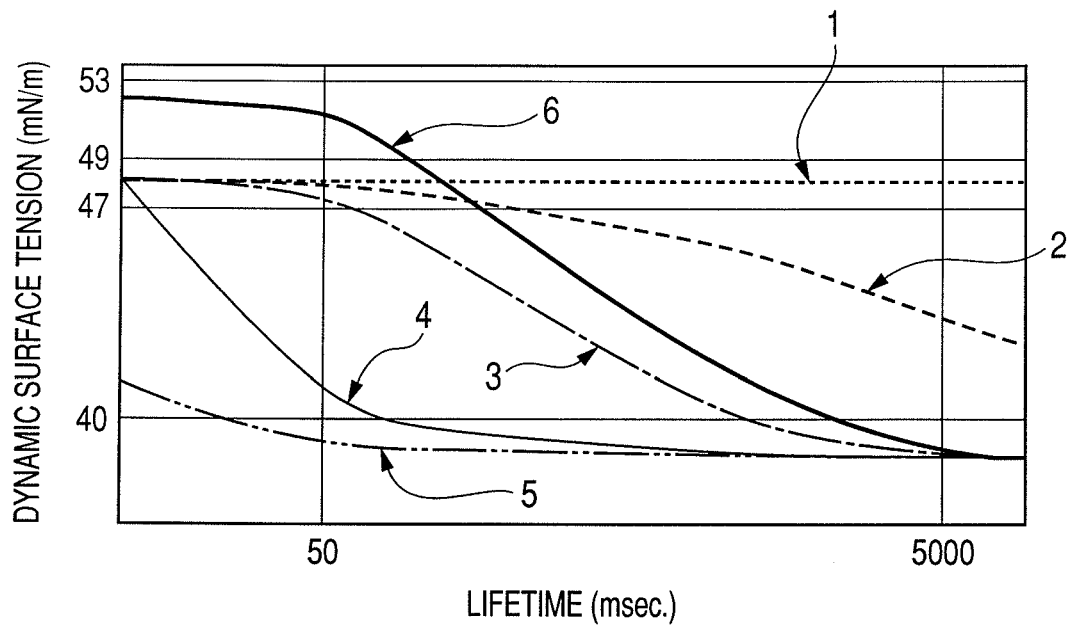
FIG. 1 is a graph showing an example of how the dynamic surface tension of the pigment inks changes.

The present invention is described below in detail by giving best modes for practicing the present invention. In what is described below, a salt is present in an ink in the state it has dissociated into ions, and this is expressed as "(the ink) contains a salt", for convenience sake. Also, permeation rate refers to the time for which, after an ink has been applied to a recording medium, the ink begins to permeate into the recording medium from its surface in the depth direction and then further permeates until the ink comes no longer present on the surface of the recording medium. This shows a phenomenon about not the time by which the ink has completely diffused in the interior of the recording medium, but, to the last, the time for which the ink is present on the surface of the recording medium. Such a phenomenon may be ascertained by a method in which, e.g., the behavior of ink (one dot) ejected out of a recording head to come to adhere to the recording medium and further permeate until any droplet of the ink comes no longer present on the surface of the recording medium is observed from the side direction of the recording medium by using a high-speed camera or the like.

A maximum bubble pressure method used in measuring the dynamic surface tension in the present invention is described first. The maximum bubble pressure method refers to a method in which the maximum pressure that is necessary to release air bubbles formed at the tip portion of a probe (capillary) dipped in a liquid for measurement is measured to determine the dynamic surface tension from this maximum pressure. The lifetime (surface age) is the time of from a point of time where, in the maximum bubble pressure method, and when the air bubbles are formed at the tip portion of the probe, surfaces of new air bubbles have been formed after the air bubbles have left the tip, up to a point of time of maximum bubble pressure (i.e., a point of time where the curvature radius of each air bubble comes equal to the radius of the tip portion of the probe). The dynamic surface tension in the present invention is the value measured at 25° C.

In the present invention, the factor that is important to improve image density is to make a pigment highly aggregate after a pigment ink has been applied to a recording medium, and keep the ink from blurring, so as to make the pigment efficiently present on the surface of the recording medium. For this end, it is important to control the aggregation of a self-dispersion pigment that comes as a result of the evaporation of water and so forth contained in the pigment ink and control the rate of the permeation of the ink into the recording medium that comes as a result of changes in dynamic surface tension of the pigment ink.

The bleeding is caused by the blurring-out of ink at boundaries between images formed using a pigment ink and images formed using a dye ink, and hence it is important to take an approach from both the pigment ink and the dye ink. For this end, it is necessary to make the pigment highly aggregate after the pigment ink has been applied to the recording medium, and keep the ink from blurring, and further to keep the dye ink from blurring after it has been applied to the recording medium. That is, in the present invention, the factor that is important to improve the bleeding resistance is roughly classified into the following two points concerned with the pigment ink and the dye ink. More specifically, the two points are i) to control the aggregation of a self-dispersion pigment that comes as a result of the evaporation of water and so forth contained in the pigment ink and control the rate of the permeation of the ink into the recording medium that comes as a result of changes in dynamic surface tension of the pigment ink and ii) to control the permeation of the dye ink into the recording medium.

Characteristics of Dynamic Surface Tension of Pigment Ink

The main technical idea in the pigment ink used in the present invention consists in keeping the dynamic surface tension of the pigment ink at a certain value or more, during the time by which, after the pigment ink has been applied to the recording medium, a good medium and/or a salt in the ink cause(s) changes in condition of the ink as a result of the evaporation and so forth of the ink.

The value of dynamic surface tension of the pigment ink at a lifetime of 50 milliseconds has influence on the image density and the bleeding resistance. What influence it has is stated below.

FIG. 1 is a graph showing an example of how the dynamic surface tension of pigment inks changes. In FIG. 1, reference numeral (1) denotes a pigment ink which maintains a dynamic surface tension of higher than 47 mN/m throughout changes in time. Reference numerals (2) and (3) denote pigment inks each having a dynamic surface tension of higher than 47 mN/m at the lifetime of 50 milliseconds and becoming lower in dynamic surface tension with changes in time. Here, the dynamic surface tension of the (3) pigment ink further changes greatly with changes in time to come to have a dynamic surface tension of 40 mN/m or less at a lifetime of 5,000 milliseconds. Reference numeral (4) denotes a pigment ink having a dynamic surface tension of higher than 47 mN/m at a very short lifetime, but changing greatly in dynamic surface tension with changes in time to come to have a dynamic surface tension of 47 mN/m or less at a lifetime of 50 milliseconds, and also thereafter becoming lower in dynamic surface tension with changes in time. Reference numeral (5) denotes a pigment ink already having a low dynamic surface tension just at a very short lifetime and also thereafter becoming lower in dynamic surface tension with changes in time. Reference numeral (6) denotes a pigment ink containing neither a good medium for self-dispersion pigment nor a salt.

The pigment inks having characteristics on such changes in dynamic surface tension as those given above individually differ in condition of inks in recording mediums, at a point of time of the lifetime of 50 milliseconds. The pigment inks (1), (2) and (3) shown in FIG. 1 each have a dynamic surface tension of higher than 47 mN/m at the lifetime of 50 milliseconds. Here, making pigment inks have a dynamic surface tension of higher than 47 mN/m at the lifetime of 50 milliseconds enables the ink to be kept from starting to permeate into the recording medium even though the recording medium has coarse fiber and many voids, i.e., has a high permeation rate. Here, inasmuch as the pigment ink contains a poor medium for self-dispersion pigment and/or a salt, changes in condition of ink come, e.g., the aggregation of a self-dispersion pigment comes that is accompanied by the evaporation of water in the pigment ink, and this enables formation of images having superior image density and bleeding resistance. According to studies made by the present inventors, this is considered due to the following mechanism. That is, at a time where a change in condition of ink (an increase in viscosity of ink) comes to such an extent as to enable improvement in image density and bleeding resistance, i.e., at a point of time where 50 milliseconds have lapsed after the pigment ink has been applied to the recording medium, the dynamic surface tension of the pigment ink is kept higher than 47 mN/m. This makes the change in condition of ink (an increase in viscosity of ink) comes, so that the water in the pigment ink evaporates from the recording medium at its surface to cause a change in composition of the ink. As the result, the poor medium for self-dispersion pigment and/or the salt in the pigment ink change(s) in concentration, whereby the aggregation and so forth of the self-dispersion pigment come about. This enables the self-dispersion pigment to be effectively present on the surface of the recording medium, and further enables every dot the ink forms, to be kept from spreading. In virtue of the above mechanism, pigment inks having characteristics like those of the pigment inks (1), (2) and (3) can form images having superior image density and bleeding resistance even on the recording medium having coarse fiber and many voids, i.e., having a high permeation rate.

Meanwhile, the pigment inks (4) and (5) each come to have a dynamic surface tension of 47 mN/m or less before 50 milliseconds lapse after the ink has been applied to the recording medium. Here, where such a pigment ink is applied to a recording medium having a small permeation rate, the ink permeates slowly into the recording medium, and hence the self-dispersion pigment comes to aggregate while the ink permeates. As the result, the self-dispersion pigment can be made present in the vicinity of the surface of the recording medium, and further every dot the ink forms can be kept from spreading. However, when such pigment inks as above are applied to the recording medium having coarse fiber and many voids, i.e., having a high permeation rate, the ink begins to permeate into the recording medium before changes in condition of ink come (such as increase in viscosity of ink and association or aggregation of coloring material). As the result, the self-dispersion pigment can not be made effectively present on the surface of the recording medium. That is, in using the recording medium having coarse fiber and many voids, i.e., having a high permeation rate, pigment inks having characteristics like those of the pigment inks (4) and (5) have higher permeation rate than aggregation rate, and hence it follows that the self-dispersion pigment permeates into the recording medium. As the result, any sufficient image density and bleeding resistance are not obtainable in some cases.

The pigment ink (6) contains neither a good medium for self-dispersion pigment nor a salt. Where such a pigment ink is applied to the recording medium having coarse fiber and many voids, i.e., having a high permeation rate, it must be a pigment ink having a dynamic surface tension of 49 mN/m or more at the lifetime of 50 milliseconds, in order to improve the image density and the bleeding resistance.

As stated above, in the case when the pigment ink does not contain any poor medium for self-dispersion pigment and/or any salt, in order to improve image density and bleeding resistance without regard to the types of recording mediums, it is necessary for the pigment ink to have dynamic surface tension having been set in the following way. That is, in order to improve image density and bleeding resistance even though the recording medium has coarse fiber and many voids, i.e., has a high permeation rate, the pigment ink must be made to have a dynamic surface tension of 49 mN/m or more at a lifetime of 50 milliseconds. Meanwhile, in the case when the pigment ink contains a poor medium for self-dispersion pigment and/or a salt, the pigment ink may be made to have a dynamic surface tension of higher than 47 mN/m at a lifetime of 50 milliseconds. Making up the pigment ink in this way enables improvement in the image density and the bleeding resistance even though the recording medium has coarse fiber and many voids, i.e., has a high permeation rate. This is because, inasmuch as the pigment ink contains a poor medium for self-dispersion pigment and/or a salt, such performance can be achieved even though the pigment ink has a lower dynamic surface tension at a lifetime of 50 milliseconds than a pigment ink not containing any poor medium for self-dispersion pigment and/or any salt.

In order to achieve especially superior bleeding resistance, it is preferable for the pigment ink to become low in dynamic surface tension with changes in time. It is further preferable for the pigment ink to have a dynamic surface tension of 40 mN/m or less at a lifetime of 5,000 milliseconds. This is because, if the pigment ink has a dynamic surface tension of higher than 47 mN/m at a lifetime of 50 milliseconds and also thereafter the pigment ink is kept in the state of a high dynamic surface tension, bleeding with undertrapping may occur. Accordingly, the pigment ink may be made to have the dynamic surface tension of 40 mN/m or less at a lifetime of 5,000 milliseconds. This can make the pigment ink change in dynamic surface tension in a large range at the lifetime of 50 milliseconds and at the lifetime of 5,000 milliseconds. As the result, the ink permeates into the recording medium immediately after the self-dispersion pigment has aggregated, and hence the bleeding resistance can especially be improved.

This undertrapping refers to a state that, because of the presence of the pigment ink on a recording medium for a long time, the self-dispersion pigment comes non-uniformly fix on the recording medium, so that images may blur in white at the boundaries where images formed using a pigment ink and images formed using a dye ink adjoin one another. Then, such bleeding with undertrapping is a problem especially remarkably coming about at regions where the pigment ink is applied in a high recoding duty when images are recorded at a high speed as in one-pass recording or the like in which images in one unit region are recorded by one-time primary scanning of a recording head.

It is preferable for the pigment ink to have the dynamic surface tension of 40 mN/m or less at a lifetime of 5,000 milliseconds, also in order to improve fixing performance of the pigment ink, i.e., make fixing speed higher. This is because, as long as the pigment ink has the dynamic surface tension of 40 mN/m or less at a lifetime of 5,000 milliseconds, any excess liquid components present on the surface of a recording medium can be made to permeate into the recording medium at a high rate even where the recording medium has dense fiber and few voids, thus the fixing speed can be made higher.

Accordingly, in order to achieve especially superior bleeding resistance and fixing performance in respect of the pigment inks (1), (2) and (3) shown in FIG. 1, which can improve the image density and the bleeding resistance, the pigment inks (2) and (3) are preferred, which becomes low in dynamic surface tension with changes in time. The pigment ink (3) is further preferred, which has the dynamic surface tension of 40 mN/m or less at a lifetime of 5,000 milliseconds.

Further, in order to enable improvement in the image density and the bleeding resistance and also obtain images with high image quality which are free of white stripes, the pigment ink may preferably have a dynamic surface tension of 53 mN/m or less at a lifetime of 50 milliseconds. If the pigment ink has a dynamic surface tension of more than 53 mN/m at a lifetime of 50 milliseconds, the ink may be unable to spread sufficiently on the recording medium within a short time by which the ink begins to permeate into the recording medium immediately after it has adhered to the recording medium. This may make it unable for the recording medium to be effectively covered with the ink, and hence it may be unable to improve the image density and the bleeding resistance and also the white stripes may occur.

Such white stripes (bond stripes) refer to white stripes that may occur at joints of recorded areas between N-th scanning and N-th+1 scanning when images are recorded at a high speed as in the one-pass recording or the like. This differs from white stripes that may conventionally be caused by any deviation of ink-shot positions because of faulty ink ejection or the like. Inasmuch as the pigment ink has the dynamic surface tension of 53 mN/m or less at a lifetime of 50 milliseconds, the white stripes can be kept from occurring. The reason therefor is not clearly certain, and the present inventors presume that the white stripes are caused by the following two factors.

Firstly, in the case of the pigment ink having the dynamic surface tension of more than 53 mN/m at a lifetime of 50 milliseconds, a plurality of ink droplets applied adjoiningly to the recording medium gather together with one another. Hence, the ink present at edges of areas where images have been recorded at the initial recording pass is drawn to a region rich in ink at the middle portion. Similarly, the ink present at edges of areas where images have been recorded at the next recording pass is also drawn to the middle portion. As the result, the white stripes occur between the edges of areas where images have been recorded at the initial recording pass and the edges of areas where images have been recorded at the next recording pass, as so presumed. Accordingly, the pigment ink may preferably have the dynamic surface tension of 53 mN/m or less at a lifetime of 50 milliseconds.

Secondly, it is considered to take a time of more than 50 milliseconds until the pigment ink permeates after it has been applied to the recording medium. During this time, the aggregation of the self-dispersion pigment or the increase in viscosity of the ink advances excessively, so that the self-dispersion pigment on the recording medium may excessively be kept from diffusing, to make it unable to obtain sufficient area factors. As the result, areas where no image has been recorded may locally come about to cause the white stripes, at the joints of areas where images are recorded at a plurality of recording passes, as so presumed.

If the pigment ink has too low dynamic surface tension at a lifetime of 5,000 milliseconds, the ink may easily permeate into the interior of the recording medium (in the thickness direction of the recording medium), and hence the ink may strike through the recording medium to its back surface, i.e., cause strike through. Accordingly, the pigment ink may preferably have a dynamic surface tension of 28 mN/m or more, and more preferably 32 mN/m or more, at a lifetime of 5,000 milliseconds.

Characteristics of Dynamic Surface Tension of Dye Ink

In the present invention, the pigment ink having the characteristics of dynamic surface tension as described above is used in combination with a dye ink described below, as an ink set. This enables more improvement in the bleeding resistance.

The main technical idea in the dye ink used in the present invention consists in keeping the dye ink from blurring on the recording medium, i.e., keeping the dynamic surface tension at a lifetime of 50 milliseconds at a certain value or more in order to make small the area per one dot the dye ink forms. This can keep the dye ink from spreading on the recording medium immediately after the dye ink has been applied to the recording medium, and can keep it from blurring.

About how the dye ink spreads on the recording medium, the present inventors have made studies as reported below. First, the present inventors have prepared various dye inks having different characteristics, which change in dynamic surface tension depending on the lifetime. Using these dye inks, the present inventors have recorded one-dot ruled lines on recording mediums such as plain paper of various types. Then, the present inventors have examined the relationship between the line width of the ruled lines and the dynamic surface tension and static surface tension of the dye inks at from a lifetime of 10 milliseconds to a lifetime of 5,000 milliseconds. As the result, it has been found that, in all types of recording mediums on which the studies have been made, the line width of the ruled lines and the dynamic surface tension of the dye ink at a lifetime of 50 milliseconds correlate most greatly. It has also been found that this correlation becomes continuously smaller as the lifetime is away backward and forward around the lifetime of 50 milliseconds. From these facts, the present inventors have reached a finding that the line width of ruled lines, i.e., how the dye ink spreads on the recording medium can be specified by studying the dynamic surface tension of the dye ink at the lifetime of 50 milliseconds. In the above studies, the line width of ruled lines is the value found by measuring that of recorded images having been left for an overnight after images have been recorded.

From the foregoing, the present inventors have made further studies taking note of the characteristics of dynamic surface tension of dye inks at a lifetime of 50 milliseconds. Stated specifically, the present inventors have prepared dye inks changed variously in dynamic surface tension at the lifetime of 50 milliseconds. Using three dye inks, the present inventors have formed images respectively, and have examined the relationship between the bleeding resistance in the images obtained and the dynamic surface tension of the dye inks at a lifetime of 50 milliseconds. As the result, the present inventors have reached a finding that the dye ink can be kept from spread excessively on the recording medium and the bleeding resistance can be improved, as long as the dye ink has a dynamic surface tension of 42 mN/m or more at a lifetime of 50 milliseconds.

As to the reason why such a high correlation is seen between how the dye ink spreads on the recording medium and the dynamic surface tension at a lifetime of 50 milliseconds, the present inventors consider it as stated below. That is, at a point of time of 50 milliseconds after a dye ink has been applied to a recording medium, at least part of the dye ink has permeated into the recording medium in a region vicinal to its surface. Then, this region is considered to be one important factor that determines the area per one dot the dye ink forms on the recording medium. In addition, the value of dynamic surface tension of the dye ink changes after the dye ink has been applied to the recording medium, so that the angle of contact between the dye ink and the recording medium changes. This is also considered to be a factor that determines the area per one dot the dye ink forms on the recording medium. Further, compared with the dye ink that is in a state of having permeated into the recording medium in its thickness direction, the water and so forth in the dye ink come to evaporate in a relatively large quantity in the dye ink that stands immediately after it has been applied onto the recording medium. The quantity in which the dye ink permeates into the recording medium in its thickness direction is considered to depend also on the dynamic surface tension at a lifetime of 50 milliseconds, and this also is considered to be another important factor that determines the area per one dot the dye ink forms on the recording medium. In virtue of such factors, the area per one dot the dye ink forms on the recording medium can be made proper.

Meanwhile, if the dye ink has a dynamic surface tension of 49 mN/m or more at a lifetime of 50 milliseconds, the spread of ink on the surface of the recording medium precedes to the permeation of ink into the recording medium in its thickness direction even if the dynamic surface tension has lowered thereafter in a great extent. Hence, the area per one dot may come so large as not to be achievable of any bleeding resistance. Accordingly, the dye ink may preferably have a dynamic surface tension of from 42 mN/m or more to less than 49 mN/m at a lifetime of 50 milliseconds.

Further, if the dye ink continues to keep a high dynamic surface tension for a long time, the permeation of the dye ink into the recording medium in its thickness direction does not advance, so that the dye ink may spread on the surface of the recording medium to cause a lowering of bleeding resistance. As a result of studies made by the present inventors, the present inventors have reached a finding that, in order to keep the bleeding resistance from lowering, the following measure may be taken. First, the dye ink is made to have a high dynamic surface tension at a lifetime of 50 milliseconds so as to keep the dye ink from spreading excessively on the recording medium. Thereafter, the dye ink is abruptly made low in dynamic surface tension to accelerate the permeation of the dye ink into the recording medium in its thickness direction, so as to further keep the dye ink from spreading on the surface of the recording medium. By taking such measure, the area per one dot the dye ink forms on the recording medium can be made more proper. Studies made by the present inventors have revealed that, in order to cause such a phenomenon, stated specifically the dynamic surface tension of the dye ink may be lowered by 7 or more during a lifetime of from 50 milliseconds to 500 milliseconds.

More specifically, the present inventors have reached a finding that, in order to improve the bleeding resistance, it is preferable for the dye ink to have the characteristics of dynamic surface tension as described below. That is, it is preferable for the dye ink to have the following two characteristics. (1) The dynamic surface tension of the dye ink at a lifetime of 50 milliseconds is from 42 mN/m or more to less than 49 mN/m. (2) Difference in dynamic surface tension of the dye ink between that at the lifetime of 50 milliseconds and that at the lifetime of 500 milliseconds is 7 mN/m or more. In particular, especially superior bleeding resistance is achievable when the dynamic surface tension at a lifetime of 50 milliseconds is from 45 mN/m or more to less than 49 mN/m or when the difference in dynamic surface tension of the dye ink between that at the lifetime of 50 milliseconds and that at the lifetime of 500 milliseconds is 10 mN/m or more.

The dye ink used in the present invention affords superior bleeding resistance as having the characteristics of dynamic surface tension as described above. Further, making the dye ink having characteristics as described below can achieve superior gradation and color uniformity and keep strike through from occurring. Of course, the present invention is by no means limited to the dye ink having the following make-up.

As a result of studies made by the present inventors on how the dye ink behaves when it evaporates and permeates into the recording medium, the present inventors have found that, in order to make uniform and small the area per one dot on the recording medium to improve gradation, the following is preferable.

Think about how the dye ink stands immediately after it has been applied onto the recording medium (e.g., on plain paper). At such a time, it is immediately after new vapor-liquid interfaces have been formed, and hence the lifetime is close to 0 second without limit, where the orientation of a surfactant to such vapor-liquid interfaces is in an negligible extent. Hence, the dynamic surface tension of the dye ink in this state may be so approximated as to be equal to the static surface tension of an aqueous medium (a mixed solvent composed of water and a water-soluble organic compound) in the dye ink. Incidentally, the "aqueous medium in the dye ink" is meant to be an aqueous medium from which any coloring material and surfactant in the dye ink have been removed, i.e., what is composed of water and a water-soluble organic compound.

On the recording medium mentioned above, areas having a high surface energy and areas having a low surface energy are present in the vicinity of areas where the dye ink has been applied. Hence, if the aqueous medium has too high static surface tension, the dye ink tends to flow in selectively toward the areas having a high surface energy and tending to wet for the ink that are present in the vicinity of the areas where the dye ink has been applied. Thus, a phenomenon of feathering may come about, and the area per one dot the dye ink forms on the recording medium may come greatly non-uniform. On the other hand, if the aqueous medium has too low static surface tension, the areas where the ink has been applied come into the state of a low surface tension, compared with the vicinity of the areas where the ink has been applied. As the result, the dye ink comes rapidly to spread, resulting in a low gradation.

Studies made by the present inventors to cope with such a problem have revealed that the following is preferable. That is, it is preferable that the vicinity of the areas on the recording medium where the dye ink has been applied is brought into the state of such an extent that the dye ink comes to wet that part uniformly, so as to keep the feathering phenomenon from occurring. It is also preferable that the dye ink is kept from spreading rapidly, so as to make small the area per one dot the dye ink forms and also make it less non-uniform. Accordingly, the present inventors have made studies, which have revealed that the static surface tension of the aqueous medium in the dye ink may be specified within a specific range, and this can keep the feathering phenomenon from occurring, or can make small the area per one dot the dye ink forms and also make it less non-uniform. Stated specifically, the present inventors have reached a finding that the aqueous medium in the dye ink may preferably have a static surface tension of from 45 mN/m or more to 57 mN/m or less.

Where plain paper or the like is used as the recording medium, it is preferable for the dye in the dye ink to be uniformly fixed to the recording medium. Here, the state of "uniformly fixed" refers not to a state that the dye in the dye ink has been taken into relatively large voids present in the plain paper or the like, the recording medium, to come localized, but to a state that the dye in the dye ink has uniformly dyed the fibers making up the recording medium. Then, in order to make the dye in the dye ink fix uniformly, it is preferable for the dye ink to be shown to wet pores such as the voids between fibers. Studies made by the present inventors on any properties favorable for the dye ink to have wettability to such pores have revealed that it is preferable to appropriately determine the dynamic surface tension of the dye ink at a lifetime of 500 milliseconds. Stated specifically, the present inventors have found that the dye ink may preferably have a dynamic surface tension of 38 mN/m or less at a lifetime of 500 milliseconds.

If the dye ink has too low dynamic surface tension at a lifetime of 500 milliseconds, stated specifically, if it has a dynamic surface tension of less than 28 mN/m, the permeation of the dye ink into the recording medium precedes to the permeation into the voids between fibers. As the result, the dye ink may readily permeate into the interior of the recording medium (in the thickness direction of the recording medium), and hence the dye ink may strike through the recording medium to its back surface, i.e., the strike through may occur. Accordingly, the dye ink may preferably have a dynamic surface tension of from 28 mN/m or more to 38 mN/m or less at a lifetime of 500 milliseconds. In the present invention, the dye ink may more preferably have a dynamic surface tension of from 32 mN/m or more to 38 mN/m or less at a lifetime of 500 milliseconds.

The difference in dynamic surface tension of the dye ink between that at the lifetime of 50 milliseconds and that at the lifetime of 500 milliseconds may preferably be large from the viewpoint of promoting the permeation of the dye ink into the recording medium after the region where the dye ink permeates into the recording medium at a lifetime of 50 milliseconds has been determined to a certain extent. However, as described above, the dye ink may preferably have a dynamic surface tension of from 28 mN/m or more at a lifetime of 500 milliseconds. Hence, the difference in dynamic surface tension of the dye ink between that at the lifetime of 50 milliseconds and that at the lifetime of 500 milliseconds may preferably be not more than [the value of dynamic surface tension at a lifetime of 50 milliseconds (mN/m)−28 (mN/m)]. Further, the difference in dynamic surface tension of the dye ink between that at the lifetime of 50 milliseconds and that at the lifetime of 500 milliseconds may more preferably be less than 21 mN/m.

—Ink Set—

The ink set of the present invention has a plurality of inks, and is characterized by having at least the pigment ink and the dye ink which have been described above. Further, the ink set may have the pigment ink and the dye ink both in plurality, and may also have an ink or inks other than these. The ink set in the present invention may include a form of ink cartridges each storing therein a plurality of inks independently, and a form of an ink cartridge set up integrally in combination of a plurality of ink storing portions each storing therein a plurality of inks. The above ink cartridges or ink cartridge may further be so set up as to be provided with a recording head formed integrally therewith. A form in which ink cartridges each storing therein a plurality of inks independently are so set up as to be detachable to an ink jet recording apparatus is defined to be also included in the ink set of the present invention. In any case, the ink set of the present invention may at least be so set up that the pigment ink and the dye ink at least are usable in combination. It is by no means limited to the above forms, and may be of any form.

The pigment ink making up the ink set of the present invention is characterized by having the characteristics of dynamic surface tension of the pigment ink as described above. In addition to the above, the pigment ink is further characterized by containing a poor medium for self-dispersion pigment and/or a salt. Except these, the pigment ink may be made up in the same way as conventional pigment inks. The dye ink may also be made up in the same way as conventional dye inks, but may preferably have the characteristics of dynamic surface tension of the dye ink as described above. In the following, components are described which are used in the pigment ink and the dye ink which make up the ink set of the present invention.

—Pigment Ink—

Surfactant

It is essential for the pigment ink to contain a surfactant as a penetrant. Then, the pigment ink mixed with the surfactant is required to have been so controlled as to have the characteristics of dynamic surface tension of the pigment ink as described above. As the surfactant, the following may be used, for example. The surfactant exemplified below may be used alone or in combination of two or more types.

Nonionic Surfactant:

Polyoxyethylene alkyl ethers, polyoxyethylene fatty esters, polyoxyethylene alkyl phenyl ethers, and polyoxyethylene-polyoxypropylene block copolymer; and fatty acid diethanol amide, acetylene glycol ethylene oxide addition product, and acetylene glycol type surfactants.

Anionic Surfactant:

Polyoxyethylene alkyl ether sulfates, polyoxyethylene alkyl ether sulfonates, polyoxyethylene alkyl phenyl ether sulfates, and polyoxyethylene alkyl phenyl ether sulfonates; and alphasulfofatty ester salts, alkylbenzene sulfonates, alkylphenol sulfonates, alkylnaphthalene sulfonates, alkyl tetraphosphosulfonates, and dialkyl sulfosuccinates.

Cationic Surfactant:

Alkyl trimethylammonium salts, and dialkyl dimethylammonium chloride.

Amphoteric Surfactant:

Alkyl carboxybetaines.

Other Surfactant:

Fluorine type surfactants and silicone type surfactants.

The pigment ink used in the present invention is required to have been so controlled as to have the characteristics of dynamic surface tension as described above. In order for the pigment ink to be so made as to have the characteristics of dynamic surface tension as described above, the dynamic surface tension of the ink may be controlled by using one or two or more kinds of the above surfactant.

In the present invention, of the above surfactants, it is particularly preferable to use the nonionic surfactant, and more preferably a polyoxyethylene alkyl ether, to control the dynamic surface tension of the pigment ink. Further, the alkyl group in the polyoxyethylene alkyl ether may preferably have 12 to 18 carbon atoms. In particular, the alkyl group may preferably be a lauryl group, a cetyl group or an oleyl group.

Further, in the present invention, the above surfactant may particularly preferably have an HLB value of from 8.0 or more to 17.0 or less as measured by the Griffin method. Here, the Griffin method is a method in which the HLB value is calculated according to the following expression (3), on the basis of the formular weight of the hydroxyl group and molecular weight of the surfactant.

$$HLB = 20 \times (\text{formular weight of the hydroxyl group of surfactant})/(\text{molecular weight of the surfactant}) \quad (3)$$

If the surfactant has an HLB value of less than 8.0, the surfactant may have so low solubility in water as to be soluble in the pigment ink with difficulty, and also the surfactant may localize on the surfaces of ink droplets to make it difficult to obtain the effect aimed in the present invention. If on the other hand the surfactant has an HLB value of more than 17.0, the surfactant may be so highly hydrophilic as to cause the strike through or the like of the ink when, e.g., images are continuously recorded where the dynamic surface tension of the pigment ink at a lifetime of 50 milliseconds is set within the desired range.

The surfactant in the pigment ink may preferably be in a content (% by mass) of from 0.10% by mass or more to 0.75% by mass or less based on the total mass of the pigment ink. If it is in a content of less than 0.10% by mass, the pigment ink may have a low wettability to the recording medium immediately after the ink has been applied to the recording medium, to cause undertrapping. If on the other hand it is in a content of more than 0.75% by mass, the pigment ink may have a high wettability to the recording medium immediately after the ink has been applied to the recording medium, where the pigment ink may begin to permeate into the recording medium before the self-dispersion pigment begins to aggregate. As the result, the image density and the bleeding resistance may not sufficiently be achievable. Further, if the surfactant is in a too large content, the surfactant present in the pigment ink in excess may affect dispersion properties or aggregation properties of the self-dispersion pigment to obstruct the changes in condition of the pigment ink due to evaporation and so forth (changes such as an increase in viscosity, and association or aggregation of the pigment). As the result, the image density and the bleeding resistance may not sufficiently be achievable.

Aqueous Medium

The pigment ink may preferably contain an aqueous medium which is a mixed solvent of water and a water-soluble organic compound. In the present invention, where the water-soluble organic compound is selected, a poor medium for self-dispersion pigment may be distinguished by the method described later and thereafter the water-soluble organic compound may be selected and appropriately mixed to prepare the pigment ink. The water-soluble organic compound in the pigment ink may preferably be in a content (% by mass) of from 3.0% by mass or more to less than 50.0% by mass based on the total mass of the pigment ink; the content being inclusive of that of a water-soluble organic compound showing behavior as a poor medium as described later.

Any water-soluble organic compound may be used as the water-soluble organic compound as long as a pigment ink is prepared which has been controlled to have the characteristics of dynamic surface tension of the pigment ink as described above and optionally contains the water-soluble organic compound showing behavior as a poor medium as described later.

As the water-soluble organic compound, stated specifically, the following compounds may be used, for example.

Alcohols having 1 to 6 carbon atoms, such as ethanol, isopropanol, 2-propanol, n-butanol, isobutanol, pentanol and hexanol; carboxylic acid amides such as N,N-dimethylformamide and N,N-dimethylacetamide; ketones or ketoalcohols such as acetone, methyl ethyl ketone and 2-methyl-2- hydroxypentan-4-one; cyclic ethers such as tetrahydrofuran and dioxane; alkylene glycols such as ethylene glycol, diethylene glycol, triethylene glycol, tetraethylene glycol, 1,2- or 1,3-propylene glycol, 1,2- or 1,4-butylene glycol, and polyethylene glycol; polyhydric alcohols such as glycerol, 1,3-butanediol, 1,2- or 1,5-pentanediol, 1,2- or 1,6-hexanediol, 2-methyl-1,3-propanediol and 1,2,6-hexanetriol; alkyl ethers of polyhydric alcohols, such as ethylene glycol monomethyl (or -ethyl) ether, diethylene glycol monomethyl(or -ethyl) ether and triethylene glycol monoethyl(or -butyl) ether; heterocyclic rings such as 2-pyrrolidone, N-methyl-2-pyrrolidone, 1,3-diemthyl-2-imidazolidinone and N-methylmorpholine; and sulfur-containing compounds such as dimethyl sulfoxide and thiodiglycol.

Of the above, it is particularly preferable to use glycerol, ethylene glycol, diethylene glycol, triethylene glycol or 2-pyrrolidone.

In order for the pigment ink to have the characteristics of dynamic surface tension of the pigment ink as described above, one or two or more types of the water-soluble organic compounds enumerated above may be used to control the dynamic surface tension of the pigment ink.

As the water, it is preferable to use deionized water (ion-exchanged water). The water in the pigment ink may preferably be in a content of from 50.0% by mass or more to 95.0% by mass or less based on the total mass of the pigment ink, in order for the pigment ink to have a viscosity suited for stable ejection of the ink and also to be an ink having been kept from any clogging at nozzle tips.

Poor Solvent for Self-Dispersion Pigment and/or Salt

The pigment ink is required to contain as an aggregation accelerator a poor medium for self-dispersion pigment and/or a salt. The aggregation accelerator in the present invention, whereas the self-dispersion pigment is stably present in the pigment ink as long as the ink is in the state any evaporation or change in wettability does not come, has the action to accelerate the aggregation of the self-dispersion pigment when the evaporation or change in wettability of the ink comes. Stated specifically, the poor medium or the salt has the action to accelerate the aggregation of the self-dispersion pigment when components making up the pigment ink have come to change in proportion as a result of the evaporation coming after the ink has been ejected or the change in wettability to the recording medium after the ink has been applied to the recording medium.

In the present invention, the pigment ink contains the poor medium for self-dispersion pigment and/or the salt so as to enable achievement of high image density in virtue of such mechanism as described below. When the pigment ink is applied to a recording medium, even though the recording medium has coarse fiber and many voids, i.e., has a high permeation rate, the self-dispersion pigment aggregates in virtue of the action of the poor medium and/or the salt, and this can cause changes in condition of the ink to keep the ink from permeating into the recording medium. That is, during the time by which the pigment ink comes to permeate into the recording medium after it has been applied to the recording medium, the self-dispersion pigment aggregates in virtue of the action of the poor medium and/or the salt, i.e., the ink changes in condition. As the result, even though the recording medium has coarse fiber and many voids, i.e., has a high permeation rate, it comes possible to control the rate of permeation of the ink into the recording medium. Then, after the self-dispersion pigment in the ink has been made to aggregate on the surface of the recording medium, the ink begins to permeate into the recording medium, and this makes it possible for the self-dispersion pigment in the ink to be more efficiently present on the surface of the recording medium. That is, it is important to use a poor medium and/or a salt which can surely make the self-dispersion pigment begin to permeate, during the time by which the pigment ink comes to permeate into the recording medium after it has been applied to the recording medium, i.e., during the time that the pigment ink is present on the surface of the recording medium.

The aggregation accelerator used in the present invention may include as its specific examples the poor medium for self-dispersion pigment and the salt. As described above, whereas the self-dispersion pigment is stably present in the pigment ink as long as the ink is in the state any evaporation or change in wettability does not come, the aggregation accelerator has the action to accelerate the aggregation of the self-dispersion pigment when the evaporation or change in wettability of the ink comes. The poor medium for self-dispersion pigment and the salt are described below.

Poor Medium for Self-dispersion Pigment:

The poor medium in the present invention refers to a solvent which can not stably keep the state of dispersion of the self-dispersion pigment with respect to the water-soluble organic compound, without regard to how to disperse the self-dispersion pigment. In the present invention, a water-soluble organic compound showing behavior as the above poor medium is used as the aggregation accelerator of the self-dispersion pigment, and the content of the poor medium in the pigment ink (standing not accompanied by evaporation) is so set that the self-dispersion pigment may stably disperse. Then, upon application of such an ink to the recording medium, the poor medium increases relatively in concentration in the course that the ink evaporates. The content of the poor medium in the pigment ink may preferably be set at such a level that the self-dispersion pigment can start its aggregation in that course. In the present invention, the water-soluble organic compound acting as the poor medium for self-dispersion pigment is used while judging its dispersion stability to the self-dispersion pigment for which it is used. Incidentally, in the present invention, any water-soluble organic compound which is not the poor medium is called a good medium.

Stated more specifically, whether or not the water-soluble organic compound to be used for a certain self-dispersion pigment stands a good medium or stands a poor medium for that pigment is judged in the following way. First, two types of dispersions Dispersion A of the certain self-dispersion pigment and Aqueous Dispersion B of the certain self-dispersion pigment are prepared which each contains the water-soluble organic compound to be judged.

A: A self-dispersion pigment dispersion having composition in which the water-soluble organic compound to be judged is in a content of 50% by mass, the self-dispersion pigment, or the total of the self-dispersion pigment and any substance contributing to dispersion of the former, is in a content of 5% by mass and the water is in a content of 45% by mass.

B: An aqueous self-dispersion pigment dispersion having composition in which the self-dispersion pigment, or the total of the self-dispersion pigment and any substance contributing to dispersion of the former, is in a content of 5% by mass and the water is in a content of 95% by mass.

Next, the above Dispersion A is stored at 60° C. for 48 hours, and thereafter cooled to normal temperature, where the average particle size of the self-dispersion pigment in the resultant Dispersion A is measured with a fiber-optics particle size analyzer (trade name: FPAR-1000; manufactured by Otsuka Electronics Co., Ltd.) or the like. The above Aqueous Dispersion B is also stored at 60° C. for 48 hours like the foregoing, and thereafter cooled to normal temperature, where the average particle size of the self-dispersion pigment in the resultant Aqueous Dispersion B is measured with the fiber-optics particle size analyzer or the like. Then, the values of average particle size of the respective self-dispersion pigments in the above Dispersion A and Aqueous Dispersion B are designated as particle size (A) and particle size (B). At this point, where the particle size (A) is larger than the particle size (B), the water-soluble organic compound is judged to be the poor medium. Where the particle size (A) is equal to or smaller than the particle size (B), the water-soluble organic compound is judged to be the good medium.

Using the poor medium having been judged in this way, the pigment ink made up as defined in the present invention has been prepared. As the result, it has been ascertained that the good results as stated previously are obtainable.

Even in the case of an ink whose composition is unknown, whether or not the ink comes under the present invention can be ascertained with ease by using a method as described below. First, the type and content of a water-soluble organic compound contained in the ink whose composition is unknown are analyzed by gas chromatography (GC/MS) or the like. Stated specifically, for example, a sample prepared by dispensing 1 g of the ink whose composition is unknown and diluting it with methanol in a stated concentration is analyzed using GC/MS (trade name: TRACE DSQ; manufactured by ThermoQuest). This can identify the type and content of the water-soluble organic compound contained in the aqueous medium of the ink.

Next, it is necessary to judge whether the water-soluble organic compound thus identified is a good medium or a poor medium. In the good medium/poor medium judgment method described previously, the dispersion is prepared in which the self-dispersion pigment has been dispersed in a liquid containing the water-soluble organic compound and water. In preparing such a dispersion from an ink, the self-dispersion pigment, or the self-dispersion pigment and any substance contributing to dispersion of the former, must be extracted from the ink. However, in such a case, there is a possibility that the self-dispersion pigment, or the self-dispersion pigment and any substance contributing to dispersion of the former, change(s) in properties in the course of extraction.

Accordingly, the present inventors have made studies on a good medium/poor medium judgment method making use of an ink itself whose composition is unknown, which is also a method by which the good medium/poor medium judgment method described previously and its results come consistent. As the result, the present inventors have found that the following method is applicable as the good medium/poor medium judgment method making use of the ink itself whose composition is unknown.

A dilute solution is prepared in which the water-soluble organic compound in the ink, identified as described above, has been added in an amount equal to the content of the water-soluble organic compound in the ink. Then, this dilute solution is stored at 60° C. for 48 hours, and thereafter cooled to normal temperature, where the average particle size of the self-dispersion pigment in the resultant dilute solution is measured with the fiber-optics particle analyzer (trade name: FPAR-1000; manufactured by Otsuka Electronics Co., Ltd.) or the like. The average particle size of the self-dispersion pigment in an ink standing not stored at 60° C. for 48 hours is also measured in the same way as the above. Then, the values of average particle size of the respective self-dispersion pigments in the dilute solution stored at 60° C. for 48 hours and the ink standing not stored at 60° C. for 48 hours are designated as particle size (A) and particle size (B). At this point, where the particle size (A) is larger than the particle size (B), the water-soluble organic compound is judged to be the poor medium. Where the particle size (A) is equal to or smaller than the particle size (B), the water-soluble organic compound is judged to be the good medium.

The poor medium in the pigment ink may preferably be in a content of from 3.0% by mass or more to 50.0% by mass or less, and more preferably from 10.0% by mass or more to 40.0% by mass or less, based on the total mass of the pigment ink. If the poor medium is in a content of less than 3.0% by mass, the effect of aggregating the self-dispersion pigment that is due to the poor medium may be not obtainable to make it unable for the self-dispersion pigment to be made much present on the surface of the recording medium. If on the other hand the poor medium is in a content of more than 40.0% by mass, any storage stability of the ink may be not achievable. Incidentally, the storage stability of the ink is commonly meant to be the storage stability of an ink standing not accompanied by the evaporation of water.

The water-soluble organic compound that is the poor medium usable in the present invention may include, as specific examples, polyethylene glycol 1,000 (average molecular weight: 1,000), polyethylene glycol 600 (average molecular weight: 600), 2-pyrrolidone, and 1,5-pentanediol. Of course, the poor medium usable in the present invention is by no means limited to these.

In the present invention, where, after the poor medium/good medium for the self-dispersion pigment has been distinguished by the method described above, the total (% by mass) of content of the good medium in the pigment ink is represented by X, and the total (% by mass) of content of the poor medium by Y, the ratio of X to Y may preferably be set in the following way. That is, the types and content of water-soluble organic compounds making up the pigment ink are so controlled that the mass ratio of X:Y [total (% by mass) of content of the good medium : total (% by mass) of content of the poor medium] comes within the range of from X:Y=10:5 or more to 10:30 or less. Here, the "ratio of X:Y=10:5 or more to 10:30 or less" means that Y is 5 or more to 30 or less when X is 10.

Salt

As the salt used in the present invention, any salt may be used as long as it acts as an electrolyte in the pigment ink. In the present invention, the salt is used as an aggregation accelerator of the self-dispersion pigment, and the content of the salt in the ink (standing not accompanied by evaporation) is so set that the self-dispersion pigment may stably disperse. Then, upon application of such an ink to the recording medium, the salt, i.e., the electrolyte increases relatively in concentration in the course that the ink evaporates. The content of the salt in the pigment ink may preferably be set at such a level that the self-dispersion pigment can start its aggregation in that course.

In the present invention, the salt in the pigment ink may be of any form that it stands dissociated in part or it stands dissociated completely. Incidentally, the salt is present in the ink in the state it has been dissociated into metal ions and negative ions. However, in the present invention, such a case is also expressed that the ink contains the salt.

The salt usable in the pigment ink is meant to be a salt made up of a positive ion shown below and a negative ion which combines with the positive ion, and is required to be water-soluble. As the positive ion for forming the salt, stated specifically, the following may be used, for example. Monovalent-metal ions such as $Li^+$, $Na^+$ and $K^+$; divalent-metal ions such as $Ca^{2+}$, $Sr^{2+}$, $Ba^{2+}$, $Cu^{2+}$, $Ni^{2+}$, $Mg^{2+}$ and $Zn^{2+}$; trivalent-metal ions such as $Al^{3+}$, $Fe^{3+}$, $Cr^{3+}$ and $Y^{3+}$; and ammonium ions and organoammonium ions. As the negative ion for forming the salt, stated specifically, the following may be used, for example. $Cl^-$, $Br^-$, $I^-$, $ClO^-$, $ClO_2^-$, $ClO_3^-$, $ClO_4^-$, $NO_2^-$, $NO_3^-$, $NO_3^-$, $SO_4^{2-}$, $CO_3^{2-}$, $HCOO^-$, $CH_3COO^-$, $C_2H_4(COO^-)_2$, $C_6H_5COO^-$ and $C_6H_4(COO^-)_2$. Of course, in the present invention, examples are by no means limited to these.

In the pigment ink, a case in which the positive ion is ammonium is preferred because superior water resistance is achievable. In particular, $NH_4NO_3$, $C_2H_4(COONH_4)_2$, $C_6H_4(COONH_4)_2$, $(NH_4)_2SO_4$ and the like are particularly preferred because the water resistance is brought out in a relatively short time.

In the present invention, a water-soluble dye or a polymer having an ionic group, which can make unstable the state of dispersion of the self-dispersion pigment may also be used as the salt.

The salt in the pigment ink may preferably be in a content (% by mass) of from 0.01% by mass or more to 10.0% by mass or less, and more preferably from 0.1% by mass or more to 5.0% by mass or less, based on the total mass of the pigment ink. If the salt is in a content of less than 0.01% by mass, the effect of the present invention may be not obtainable. If it is in a content of more than 10.0% by mass, any storage stability and so forth of the ink may be not achievable. Incidentally, the storage stability of the ink is commonly meant to be the storage stability of an ink standing not accompanied by the evaporation of water.

Use of Poor Medium and Salt in Combination:

The pigment ink may contain the poor medium and the salt in combination. In the present invention, both the poor medium and the salt may be used as aggregation accelerators of the self-dispersion pigment, where the content of the poor medium and the content of the salt in the ink (standing not accompanied by evaporation) are so set that the self-dispersion pigment may stably disperse. Then, upon application of such an ink to the recording medium, the poor medium and the salt (electrolyte) increases relatively in concentration in the course that the ink evaporates. The content of the poor medium and the content of the salt in the pigment ink may each preferably be set at such a level that the self-dispersion pigment can start its aggregation in that course.

The poor medium in the pigment ink in the case when the poor medium and the salt are used in combination may preferably be in a content (% by mass) of from 3.0% by mass or more to 40.0% by mass or less, and more preferably from 3.0% by mass or more to 20.0% by mass or less, based on the total mass of the pigment ink. The salt in the pigment ink in the case when the poor medium and the salt are used in combination may preferably be in a content (% by mass) of from 0.01% by mass or more to 5.0% by mass or less, and more preferably from 0.1% by mass or more to 5.0% by mass or less, based on the total mass of the pigment ink. Further, the content of the poor medium and the content of the salt in the pigment ink in the case when the poor medium and the salt are used in combination may preferably be set in a ratio (poor medium/salt) of from 0.6 or more to 200 or less. Setting the ratio of the content of the poor medium to the content of the salt within the above range can make the effect of the present invention more efficiently obtainable.

Pigment

The coloring material used in the pigment ink is a pigment such as carbon black or an organic pigment. The pigment in the pigment ink may preferably be in a content (% by mass) of from 0.1% by mass or more to 15.0% by mass or less, and more preferably from 1% by mass or more to 10.0% by mass or less, based on the total mass of the pigment ink.

In a way of dispersion of the pigment, the pigment may include, e.g., a pigment of a polymer dispersion type (a polymer dispersion pigment), which makes use of a dispersing agent, and a pigment of a surface-active agent dispersion type. As a pigment having been improved in dispersibility of the pigment itself so as to be made dispersible without use of any dispersing agent or the like, it may also include the following pigments. That is, it may include a microcapsule pigment, a pigment of a self-dispersion type (a self-dispersion pigment), in which hydrophilic groups have been introduced into the pigment particle surface portions, and a pigment in which organic groups containing a high polymer stand chemically bonded to the pigment particle surfaces (a polymer-bonded self-dispersion pigment).

In the present invention, as the pigment used in the pigment ink, it is required to use the self-dispersion pigment, which includes the above polymer dispersion pigment and the polymer-bonded self-dispersion pigment. Such a self-dispersion pigment is used, whereby there is no need to add a dispersant for dispersing a pigment in an aqueous medium constituting an ink. Of course, a polymer dispersant can be used together with the self-dispersion pigment, if necessary. This is because, in the self-dispersion pigment, the changes in condition of ink (such as increase in viscosity of ink and association or aggregation of coloring material) may readily come because of evaporation and so forth of the ink, after the pigment ink has been applied to the recording medium. However, as long as the pigment ink contains at least the self-dispersion pigment, any pigment which differs in the way of dispersion as noted above may further be used in combination.

In the present invention, it is preferable to use a pigment to the pigment particle surfaces of which a hydrophilic group has chemically been bonded directly or via other atomic group. In particular, the hydrophilic group may preferably be a group selected from the group consisting of —COOM, —$SO_3M$ and —$PO_3HM_2$ (wherein M represents a hydrogen atom, an alkali metal, ammonium or organoammonium). In addition, the above other atomic group may preferably be an alkylene group having 1 to 12 carbon atoms, a substituted or unsubstituted phenylene group or a substituted or unsubstituted naphthylene group.

In the present invention, a surface oxidation-treated self-dispersion pigment may also be used which is obtained by a method in which a pigment is oxidation-treated with sodium hypochloride, a method in which a pigment is oxidized by submerged ozone treatment or a method in which pigment particle surfaces are modified by carrying out ozone treatment and thereafter making wet oxidation with an oxidizing agent.

Further, in the present invention, a polymer-bonded self-dispersion pigment may also be used which has been improved in dispersibility of the pigment itself so as to be dispersible without use of any dispersing agent or the like. The polymer-bonded self-dispersion pigment may preferably be a pigment containing a reaction product of i) a functional group having chemically been bonded to the pigment particle surfaces directly or via other atomic group and ii) a copolymer of an ionic monomer and a hydrophobic monomer. The pigment having such structure is preferable because the copolymerization ratio of the ionic monomer to the hydrophobic monomer which monomers make up a copolymer used when pigment particle surfaces are modified can appropriately be changed, and this enables adjustment of the hydrophilicity of the pigment. Further, the types of the ionic monomer and hydrophobic monomer and the combination of these monomers can appropriately be selected, and hence this can also provide the pigment particle surfaces with various properties. Thus, such a pigment is preferable also in view of this point.

Carbon Black:

Carbon black such as furnace black, lamp black, acetylene black or channel black may be used as the carbon black. Stated specifically, the following may be used, for example:

RAVEN: 1170, 1190 ULTRA-II, 1200, 1250, 1255, 1500, 2000, 3500, 5000, 5250, 5750 and 700 (the foregoing are available from Columbian Carbon Japan Limited); BLACK PEARLS L, REGAL: 330R, 400R and 660R, MOGUL L, MONARCH: 700, 800, 880, 900, 1000, 1100, 1300, 1400 and 2000, and VALCAN XC-72 (the foregoing are available from Cabot Corp.); COLOR BLACK: FW1, FW2, FW2V, FW18, FW200, S150, S160 and S170, PRINTEX: 35, U, V, 140U and 140V, SPECIAL BLACK: 4, 4A, 5 and 6, (the foregoing are available from Degussa Corp.); and No. 25, No. 33, No. 40, No. 47, No. 52, No. 900, No. 2300, MCF-88, MA600, MA7, MA8, and MA100 (the foregoing are available from Mitsubishi Chemicals, Inc.).

In the present invention, examples are by no means limited to these, and any conventionally known carbon black may be used. Fine magnetic-material particles of magnetite, ferrite or the like, and titanium black may also be used as the pigment.

Organic Pigment:

As the organic pigment, stated specifically, the following may be used, for example:

Water-insoluble azo pigments such as Toluidine Red, Toluidine maroon, Hanza Yellow, Benzidine Yellow and Pyrazolone Red; water-soluble azo pigments such as Lithol Red, Helio Bordeaux, Pigment Scarlet and Permanent Red 2B; derivatives from vat dyes, such as alizarin, indanthrone and Thioindigo maroon; phthalocyanine type pigments such as Phthalocyanine Blue and Phthalocyanine Green; quinacridone type pigments such as Quinacridone Red and Quinacridone Magenta; perylene type pigments such as Perylene Red and Perylene Scarlet; isoindolinone type pigments such as Isoindolinone Yellow and Isoindolinone Orange; imidazolone type pigments such as Benzimidazolone Yellow, Benzimidazolone Orange and Benzimidazolone Red; pyranthrone type pigments such as Pyranthrone Red and Pyranthrone Orange; indigo type pigments; condensation azo type pigments; thioindigo type pigments; and other pigments such as Flavanthrone Yellow, Acyl Amide Yellow, Quinophthalone Yellow, Nickel Azo Yellow, Copper Azomethine Yellow, Perinone Orange, Anthrone Orange, Dianthraquinonyl Red, and Dioxazine Violet.

When organic pigments are shown by Color Index (C.I.) Number, the following may be used, for example.

C.I. Pigment Yellow: 12, 13, 14, 17, 20, 24, 74, 83, 86, 93, 109, 110, 117, 120, 125, 128, 137, 138, 147, 148, 151, 153, 154, 166, 168, etc.; C.I. Pigment Orange: 16, 36, 43, 51, 55, 59, 61, 71, etc.; C.I. Pigment Red: 9, 48, 49, 52, 53, 57, 97, 122, 123, 149, 168, 175, 176, 177, 180, 192, 215, 216, 217, 220, 223, 224, 226, 227, 228, 238, 240, etc.; C.I. Pigment Violet: 19, 23, 29, 30, 37, 40, 50, etc.; C.I. Pigment Blue: 15, 15:1, 15:3, 15:4, 15:6, 22, 60, 64, etc.; C.I. Pigment Green: 7, 36, etc.; and C.I. Pigment Brown: 23, 25, 26, etc.

Dispersing Agent:

In the present invention, a dispersing agent may be used in order to disperse the pigment in the aqueous medium of the pigment ink. Any polymer may be used as the dispersing agent. The polymer may preferably be one having a weight average molecular weight of from 1,000 or more to 30,000 or less, and more preferably from 3,000 or more to 15,000 or less. The polymer in the ink may preferably be in a content (% by mass) of from 0.1% by mass or more to 10.0% by mass or less based on the total mass of the ink. The content of the pigment and the content of the polymer in the pigment ink may preferably be in a ratio (P/B) of from 0.02 or more to 150 or less.

As the dispersing agent, stated specifically, e.g., a block copolymer, a random copolymer, a graft copolymer or a salt or the like thereof may be used which is obtained by polymerizing at least two monomers selected from the following group (at least one of them is a hydrophilic monomer). These polymers are soluble in an aqueous solution in which a base has been dissolved, i.e., alkali-soluble type polymers. Usable monomers are styrene, styrene derivatives, vinyl naphthalene, vinyl naphthalene derivatives, acrylic acid, acrylic acid derivatives, maleic acid, maleic acid derivatives, itaconic acid, itaconic acid derivatives, fumaric acid, fumaric acid derivatives, aliphatic alcohol esters of $\alpha,\beta$-ethylenically unsaturated carboxylic acids, vinyl acetate, vinyl pyrrolidone, acrylamide, and derivatives of these. Instead, natural polymers such as rosin, shellac and starch may also be used.

Aggregation Rate of Self-Dispersion Pigment:

The present inventors have found that a self-dispersion pigment showing specific aggregation behavior is especially effective in order to achieve superior image density and bleeding resistance.

In general, applying the ink containing the self-dispersion pigment and the poor medium for self-dispersion pigment and/or the salt (hereinafter often "aggregation accelerator(s)") causes the following phenomenon. That is, when the water in ink evaporates on the recording medium or solid-liquid separation comes between the water-soluble organic compound and any solid content such as the self-dispersion pigment in the ink, the state of dispersion of the self-dispersion pigment in the ink rapidly turns unstable to make the self-dispersion pigment come to aggregate. At the time of such aggregation, the aggregation accelerator(s) in the ink become(s) relatively high in concentration. This is considered to greatly affect the state of dispersion of the pigment to make it unstable. In fact, between an ink containing the aggregation accelerator(s) and an ink containing no aggregation accelerator(s), the ink containing the aggregation accelerator(s) has the self-dispersion pigment in a larger quantity that is present on the surface of the recording medium, to bring a higher image density.

Studies made by the present inventors have revealed that, in the ink having the characteristics of dynamic surface tension as described above, a great difference comes about in the resultant image density if the self-dispersion pigment differs in its type, even though the aggregation accelerator(s) is/are of the same type.

Figure 2:
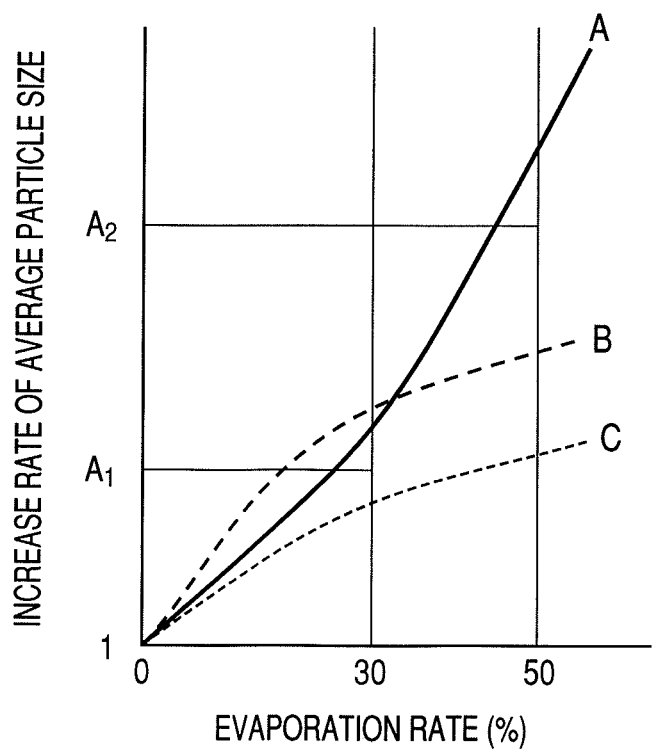
FIG. 2 is a graph showing the relationship between the evaporation rate of liquid and the increase rate of the average particle size.

Accordingly, in order to make model observation on how the self-dispersion pigment behaves for its aggregation when a salt in ink has relatively increased in concentration as a result that, e.g., the water in the ink evaporates on the recording medium, the present inventors have made studies as reported below, on inks containing various self-dispersion pigments. Stated specifically, inks containing various self-dispersion pigments were prepared, and sodium chloride was added thereto to such an extent that the state of dispersion was able to be stably kept. Then, such inks were made to evaporate to make the sodium chloride in each ink relatively increase in concentration, where the relation between the concentration of sodium chloride and the average particle size of the self-dispersion pigment was examined. Next, an ink to which the sodium chloride was added in a minimum quantity necessary for the self-dispersion pigment to increase in its average particle size was used as a reference, on the basis of which a graph was prepared, plotting the evaporation rate (%) of each ink as abscissa and the increase rate of the average particle size of the self-dispersion pigment as ordinate (FIG. 2). Here, in the following description, as to the "evaporation rate", the ink to which the sodium chloride has been added in a minimum quantity necessary for the self-dispersion pigment to increase in its average particle size is used as a reference (an initial ink) and the ink is made to evaporate, where the value found according to the following expression is regarded as the evaporation rate. That is, the evaporation rate is defined to be the value found as: evaporation rate (%)={(mass of initial ink–mass of ink after evaporation)/mass of initial ink}×100.

As the result, it has been found that the self-dispersion pigment is classified into those shown by curves (A), (B) and (C) in FIG. 2. It has further been found that, where images are formed using the inks respectively containing these self-dispersion pigments, differences come about in the image density and bleeding resistance to be achieved. That is, the ink containing the self-dispersion pigment showing aggregation behavior as (B) in FIG. 2 has afforded image density and bleeding resistance which are superior to those of the ink containing the self-dispersion pigment (C). The ink containing the self-dispersion pigment showing aggregation behavior as (A) in FIG. 2 has afforded image density and bleeding resistance which are more superior to those of the ink containing the self-dispersion pigment (B). From the foregoing, the present inventors have found that slants of tangent lines of the curves in FIG. 2, i.e., changes in average particle size of self-dispersion pigments that are accompanied by the evaporation of inks have some correlation with the image density and bleeding resistance.

The relationship between the slants of tangent lines of the curves in FIG. 2 and the image density and bleeding resistance is described below. A self-dispersion pigment having a high increase rate of the average particle size when the evaporation rate is 30% may be considered to be a self-dispersion pigment having a high aggregation rate. Here, self-dispersion pigments the increase rate $A_1$ of the average particle size when the evaporation rate is 30%, of which is a certain value or more (e.g., as in the case of the self-dispersion pigments (A) and (B)) are considered to show the following aggregation behavior on the recording medium. That is, it is considered that the self-dispersion pigment comes to aggregate immediately after the state of dispersion of the self-dispersion pigment has become unstable as a result of the evaporation of water and so forth in the ink. As to an ink the dynamic surface tension of which is kept at a stated value or more for a certain period of time after the ink has been applied to a recording medium, as in the pigment ink used in the present invention, the ink is kept from permeating into the recording medium, during which the self-dispersion pigment especially rapidly comes to aggregate also in cooperation with the effect brought by the aggregation accelerator(s). For such a reason, the higher the increase rate $A_1$ of the average particle size, of the self-dispersion pigment is, the more especially effectively the self-dispersion pigment can be made present on the surface of the recording medium, and hence a superior image density can be achieved, as so considered. It is also considered that, the self-dispersion pigment especially rapidly comes to aggregate, so that the ink can remarkably be kept from blurring to regions of images formed using other inks, and hence a more superior bleeding resistance can be achieved.

The present inventors have made studies on the relationship between i) the evaporation rate of each of inks obtained by adding various self-dispersion pigments to the pigment ink having the characteristics of dynamic surface tension as specified in the present invention and ii) the image density and bleeding resistance. As the result, the present inventors have found that the aggregation rate of the self-dispersion pigment at an evaporation rate of 30% correlates greatly with the image density and bleeding resistance. More specifically, the present inventors have reached a finding that the use of a self-dispersion pigment having such an aggregation rate that its average particle size comes to 15 times or more the one in an initial liquid until the evaporation rate reaches 30% enables achievement of especially superior image density and bleeding resistance. As to the reason therefor, the present inventors presume it as stated below.

The pigment ink having the characteristics of dynamic surface tension as specified in the present invention has the dynamic surface tension that is kept at the stated value for a certain period of time after the ink has been applied to a recording medium, thus the ink is kept from permeating into the recording medium. During this time, the water and so forth come to evaporate at the surfaces of ink droplets and in the vicinity thereof, and the state of dispersion of the self-dispersion pigment at the surfaces of ink droplets and in the vicinity thereof gradually becomes unstable, so that the self-dispersion pigment begins to aggregate. Thereafter, the ink having been applied to the recording medium begins to permeate into the recording medium with lapse of time. At this point, the time in which the ink begins to permeate into the recording medium and the time in which the evaporation rate of the water and so forth at the surfaces of ink droplets and in the vicinity thereof reaches 30% are substantially the same in scale. From this fact, the aggregation rate of the pigment at an evaporation rate of 30% is considered to correlates greatly with the image density and bleeding resistance.

From what has been described above, in the present invention, in order to achieve especially superior image density and bleeding resistance, it is particularly preferable to use, stated specifically, a self-dispersion pigment the value of $A_1$ at an evaporation rate of 30% of which is 15 or more.

Stated specifically, it is particularly preferable to use a self-dispersion pigment satisfying the following requirement. Sodium chloride is added to an ink in a minimum quantity necessary for the self-dispersion pigment to change in its average particle size, to prepare a liquid (called "initial liquid"). Then, the increase rate $A_1$ of the average particle size, of the self-dispersion pigment at an evaporation rate of 30% that is determined as the value of {(mass of initial liquid–mass of liquid after evaporation)/mass of initial liquid}×100 is found according to the following expression (1). Here, a self-dispersion pigment satisfying the requirement of $A_1 \geq 15$ may be used, and this enables achievement of especially superior image density and bleeding resistance.

Increase rate $A_1$ of average particle size=(Average particle size of self-dispersion pigment at evaporation rate of 30%)/(Average particle size of self-dispersion pigment at evaporation rate of 0%). Expression (1)

When the increase rate of the average particle size is actually determined, it may preferably be done by the following procedure. First, average particle size (noted as $R_0$) of a self-dispersion pigment in an ink is measured. Next, to inks of the same type as the above, sodium chloride is added in amounts of 0.1 g, 0.2 g and up to N g at intervals of 0.1 g to prepare a plurality of liquids having been adjusted to be 100.0 g in total mass. Then, average particle sizes ($R_{0.1}$, $R_{0.2}$ and up to $R_N$) of self-dispersion pigments in these respective liquids are individually measured. Here, the amount of sodium chloride added that is at the time the average particle size $R_N$ of the self-dispersion pigment comes to be larger than the average particle size $R_0$ of the self-dispersion pigment in the liquid containing no sodium chloride is regarded as "minimum quantity necessary for the self-dispersion pigment to change in average particle size".

The water-soluble organic compound or the surfactant is known to have, depending on its type or content, an influence on the state of dispersion of the self-dispersion pigment, i.e., the average particle size of the self-dispersion pigment. However, studies made by the present inventors have revealed that the water-soluble organic compound or the surfactant has little influence on the increase rate of the average particle size after the self-dispersion pigment has changed in average particle size, as long as it is what is commonly used as that in water base inks. Accordingly, the above method of calculating the increase rate of the average particle size is likewise applicable also to any ink as long as it is a pigment ink containing the self-dispersion pigment, which besides contains additives such as a dye, a water-soluble organic compound, a surfactant, a pH adjuster, an anticeptic agent, a mildew-proofing agent, an antioxidant and a chelating agent.

Studies further made by the present inventors have revealed that the rate of aggregation of the self-dispersion pigment at an evaporation rate of 50%, to which the evaporation has further advanced from the state of an evaporation rate of 30% of the liquid, also correlates greatly with the image density and bleeding resistance. First, like the above, sodium chloride is added to an ink in the minimum quantity necessary for the self-dispersion pigment to change in average particle size, to prepare a liquid (noted "initial liquid"). Then, the increase rate $A_2$ of the average particle size, of the self-dispersion pigment at an evaporation rate of 50% that is determined as the value of {(mass of initial liquid−mass of liquid after evaporation)/mass of initial liquid}×100 is found according to the following expression (2).

Increase rate $A_2$ of average particle size=(Average particle size of self-dispersion pigment at evaporation rate of 50%)/(Average particle size of self-dispersion pigment at evaporation rate of 0%). Expression (2)

A self-dispersion pigment the increase rate $A_2$ of the average particle size at an evaporation rate of 50%, of which is a certain value or more with respect to the increase rate $A_1$ of the average particle size at an evaporation rate of 30%, (e.g., as in the case of the self-dispersion pigment (A)) is considered to show the following aggregation behavior on the recording medium. That is, it is considered that the aggregation of the self-dispersion pigment until the evaporation rate reaches 50% from 30% comes more rapidly, compared with the aggregation of the self-dispersion pigment until the evaporation rate reaches 30% from 0% (the initial). Taking account of such rate of aggregation of the self-dispersion pigment on the recording medium, the more and more the evaporation of water and so forth advances, the more acceleratedly the self-dispersion pigment comes to aggregate. For such a reason, the self-dispersion pigment can be made very effectively present on the surface of the recording medium, and hence a very superior image density can be achieved, as so considered. It is also considered that, the self-dispersion pigment acceleratedly comes to aggregate, so that the ink can especially remarkably be kept from blurring to regions of images formed using other inks, and hence a very superior bleeding resistance can be achieved.

On the other hand, a self-dispersion pigment the increase rate $A_2$ of the average particle size at an evaporation rate of 50%, of which is a certain value or less with respect to the increase rate $A_1$ of the average particle size at an evaporation rate of 30%, (e.g., as in the case of the self-dispersion pigment (B)) is considered to show the following aggregation behavior on the recording medium. That is, it is considered that the aggregation of the self-dispersion pigment until the evaporation rate reaches 50% from 30% comes gently, compared with the behavior of aggregation until the evaporation rate reaches 30% from 0% (the initial).

Such a difference in aggregation rate of the self-dispersion pigment has an influence on image performance, and hence the pigment ink containing the self-dispersion pigment having aggregation rate like that of the self-dispersion pigment (A) affords very superior image density and bleeding resistance. This is because the dynamic surface tension is kept at a stated value or more for a certain period of time after the ink has been applied to a recording medium, and the ink is kept from permeating into the recording medium, during which the self-dispersion pigment very rapidly comes to aggregate also in cooperation with the effect brought by the aggregation accelerator(s).

The present inventors have made studies on the relationship between i) the evaporation rate of each of pigment inks obtained by adding various self-dispersion pigments to the pigment ink having the characteristics of dynamic surface tension as specified in the present invention and ii) the image density and bleeding resistance. As the result, the present inventors have found that the aggregation rate of the self-dispersion pigment at an evaporation rate of 30% and that of 50% correlate especially greatly with the image density and bleeding resistance. Stated specifically, the present inventors have reached a finding that the self-dispersion pigment having such an aggregation rate that its average particle size comes to 15 times or more the one in the initial liquid until the evaporation rate reaches 30% may further have the following aggregation rate and this enables achievement of very superior image density and bleeding resistance. More specifically, the present inventors have reached a finding that the use of the above self-dispersion pigment the increase rate of the average particle size at an evaporation rate of 50% of which is larger by 5/3 than the increase rate of the average particle size at an evaporation rate of 30% enables achievement of very superior image density and bleeding resistance. As to the reason therefor, the present inventors presume it as stated below.

As stated above, after the ink has been applied to a recording medium, the scale of the time in which the evaporation rate at the surfaces of ink droplets and in the vicinity thereof reaches 30% is substantially the same as the scale of the time in which the ink begins to permeate into the recording medium. Upon further lapse of time, the permeation of the ink into the recording medium advances rapidly. In this course, the water and so forth subsequently come to evaporate at the surfaces of ink droplets and in the vicinity thereof, and the aggregation of the self-dispersion pigment much more advances. At this point, if the aggregation of the self-dispersion pigment advances at a high rate, the self-dispersion pigment can remain on the surface of the recording medium even in the course where the permeation of the ink into the recording medium advances rapidly. If on the other hand the aggregation of the self-dispersion pigment advances slowly, the permeation of the ink into the recording medium advances rapidly and this makes small the proportion in which the self-dispersion pigment remains on the surface of the recording medium. When the evaporation of water and so forth at the surfaces of ink droplets and in the vicinity thereof reaches 50%, the permeation of the ink into the recording medium has substantially been completed. That is, the rate of aggregation of the self-dispersion pigment at an evaporation rate of 50% is considered to correlate especially greatly with the image density and bleeding resistance.

Thus, it is considered that the self-dispersion pigment can be made very effectively present on the surface of the recording medium and hence very superior image density and bleeding resistance can be achieved. More specifically, the use of a self-dispersion pigment in which the aggregation rate until the evaporation rate reaches 50% from 30% is higher than the evaporation rate at an evaporation rate of 30% enables achievement of very superior image density and bleeding resistance. That is, it is particularly preferable to use a self-dispersion pigment in which the value of $A_1$ at an evaporation rate of 30% is 15 or more and the value of $A_2$ at an evaporation rate of 50% is larger by 5/3 times the value of $A_1$.

Stated specifically, it is particularly preferable to use a self-dispersion pigment satisfying the following requirement. That is, the use of the self-dispersion pigment satisfying the requirement of $A_1 \geqq 15$ for the increase rate $A_1$ of the average particle size, of the self-dispersion pigment at an evaporation rate of 30% of the above liquid, as described previously, enables achievement of superior image density and bleeding resistance. Further, the use of the self-dispersion pigment satisfying the requirement of $A_2 > (5/3) \times A_1$ for the increase rate $A_2$ of the average particle size, of the self-dispersion pigment at an evaporation rate of 50% of the above liquid enables achievement of very superior image density and bleeding resistance.

As the self-dispersion pigment, any self-dispersion pigment may be used as long as it has the characteristics of dynamic surface tension as described above. In the present invention, it is particularly preferable to use a self-dispersion pigment to the pigment particle surfaces of which an —R—(COOM)$_n$ group has been bonded directly or via other atomic group. In the above formula, R is an alkylene group or an aromatic ring, M is a hydrogen atom, an alkali metal, ammonium or an organoammonium, and n is an integer of 1 to 3. The alkylene group may preferably have 1 to 6 carbon atoms, and may specifically include a methylene group, an ethylene group, a propylene group, a butylene group, a pentene group, a hexylene group and an isopropylene group. The aromatic ring may include a benzene ring and a naphthylene group. The alkali metal may include lithium, sodium and potassium. The organoammonium may include acetamide, benzamide, methylamino, butylamino, diethylamino and phenylamino. In the present invention, it is particularly preferable to use a self-dispersion pigment to the pigment particle surfaces of which a compound having at least the —R—(COOM)$_n$ group has been bonded, which is obtained by a diazo coupling process or the like.

The —R—(COOM)$_n$ group may be introduced to the pigment particle surfaces in a large quantity per unit surface area of pigment particles. This is preferable in order to obtain the effect of the present invention. Stated specifically, the density of ionic groups per unit surface area of pigment particles may preferably be 1.0 μmol/m$^2$ or more, and more preferably 2.5 mmol/m$^2$ or more. The upper limit of the density of ionic groups per unit surface area of pigment particles may preferably be 4.0 μmol/m$^2$. The density of ionic groups may be determined by, e.g., measuring with an ionic meter the concentration of alkali metal ions such as sodium ions present in a pigment dispersion, and calculating it into ionic-group density from the value obtained.

The self-dispersion pigment used in the pigment ink may be used in one kind or in two or more kinds as long as it satisfies the relationship between the evaporation rate and the increase rate of the average particle size as described above. Further, in order to adjust color tones or the like, other coloring material(s) may be used in combination, in addition to the self-dispersion pigment. Note, however, that in the case when such other coloring material(s) is used, it may preferably be so used that the effect to be brought by the use thereof may be obtained and the effect aimed in the present invention may not be damaged.

Relationship Between Self-Dispersion Pigment, Salt and Penetrant:

The relationship between the self-dispersion pigment, the salt and the penetrant in the pigment ink is described below. There is a close relationship between the ionic-group density of the self-dispersion pigment and the content of the salt and that of the penetrant (in particular, the surfactant). In order to obtain the effect of the present invention efficiently, it is preferable to control the content of the salt and that of the surfactant in such a way as described later.

The ionic-group density of the self-dispersion pigment is greatly concerned with dispersion stability, and there is found a tendency that, the higher the ionic-group density is, the stabler the state of dispersion of the self-dispersion pigment becomes. In a pigment ink containing a self-dispersion pigment having a low ionic-group density, the state of dispersion of the self-dispersion pigment relatively easily becomes unstable as a result that the water in the ink evaporates on a recording medium at a point of time that 50 milliseconds have lapsed after the ink has been applied to the recording medium. At this point, the pigment ink containing such a self-dispersion pigment having a low ionic-group density is relatively low stable for the state of dispersion of the self-dispersion pigment. Hence, the salt may be used in a relatively small quantity, whereby the self-dispersion pigment can be made effectively present on the surface of the recording medium. On the other hand, in a pigment ink containing a self-dispersion pigment having a high ionic-group density, the self-dispersion pigment still keeps a stable state of dispersion although the water in the ink evaporates on a recording medium at a point of time that 50 milliseconds have lapsed after the ink has been applied to the recording medium. Hence, in order to make the self-dispersion pigment effectively present on the surface of the recording medium, it is necessary to use the aggregation accelerator such as the salt.

As stated above, there is a close relationship between the ionic-group density of the self-dispersion pigment and the content of the salt in the pigment ink and there is found a tendency that, the higher the ionic-group density is, the larger the content of salt must be that is necessary for the self-dispersion pigment to be made effectively present on the surface of the recording medium. The ionic-group density and the state of dispersion of the self-dispersion pigment have a relationship between them as stated below. In the case when the self-dispersion pigment having a relatively low ionic-group density is used, the state of dispersion of the self-dispersion pigment is relatively low stable as stated above, if the pigment ink has a dynamic surface tension of 49 mN/m or more at a lifetime of 50 milliseconds. Hence, where a self-dispersion pigment is used which has an ionic-group density of from 1.0 μmol/m or more to less than 2.5 μmol/m$^2$, good image density may be achieved even if any salt is not added to the pigment ink having the characteristics of dynamic surface tension as specified in the present invention. On the other hand, in the case when the self-dispersion pigment having a relatively high ionic-group density is used, the state of dispersion of the self-dispersion pigment is relatively high stable as stated above, if the pigment ink has a dynamic surface tension of less than 49 mN/m at a lifetime of 50 milliseconds. Hence, where the self-dispersion pigment having an ionic-group density of from 2.5 μmol/m$^2$ or more to 4.0 μmol/m$^2$ or less is used as the coloring material having the characteristics of dynamic surface tension as specified in the present invention, in order to achieve good image density, it is preferable to use the pigment ink containing the salt.

The ionic-group density of the self-dispersion pigment is also greatly concerned with the content of the penetrant, in particular, the surfactant. More specifically, the higher ionic-group density the self-dispersion pigment has, the relatively less sites may be present at which the surfactant adsorbs the self-dispersion pigment. Hence, the surfactant in the pigment ink may be in a small content. On the other hand, the lower ionic-group density the self-dispersion pigment has, the relatively more sites may be present at which the surfactant adsorbs the self-dispersion pigment. Hence, the surfactant in the pigment ink must be in a large content.

Other Components:

Besides the components shown above, the pigment ink may contain a moisture-retentive solid matter such as urea, a urea derivative, trimethylol propane or trimethylol ethane in order to keep moisture retention. The moisture-retentive solid matter in the pigment ink may preferably be in a content (% by mass) of from 0.1% by mass or more to 20.0% by mass or less, and more preferably from 3.0% by mass or more to 10.0% by mass or less, based on the total mass of the pigment ink.

Besides the foregoing, as long as the effect of the present invention is not damaged, the pigment ink may also optionally contain various additives. As the additives, stated specifically, the following ones may be used, as exemplified by a nitrogen-containing compound such as urea or ethylene urea, a pH adjuster, a rust preventive, an anticeptic agent, a mildew-proofing agent, an antioxidant, a reduction preventive, an evaporation accelerator and a chelating agent.

—Dye Ink—

Surface-Active Agent

It is essential for the dye ink to contain a surfactant. Then, the dye ink mixed with the surfactant may preferably be one having been so controlled as to have the same characteristics as the characteristics of dynamic surface tension of the dye ink as described above. As the surfactant, the following may be used, for example. The surfactant exemplified below may be used alone or in combination of two or more types.

Nonionic Surfactant:

Polyoxyethylene alkyl ethers, polyoxyethylene fatty esters, polyoxyethylene alkyl phenyl ethers, and polyoxyethylene-polyoxypropylene block copolymer; and fatty acid diethanol amide, acetylene glycol ethylene oxide addition product, and acetylene glycol type surfactants.

Anionic Surfactant:

Polyoxyethylene alkyl ether sulfates, polyoxyethylene alkyl ether sulfonates, polyoxyethylene alkyl phenyl ether sulfates, and polyoxyethylene alkyl phenyl ether sulfonates; and alphasulfofatty ester salts, alkylbenzene sulfonates, alkylphenol sulfonates, alkylnaphthalene sulfonates, alkyl tetraphosphosulfonates, and dialkyl sulfosuccinates.

Cationic Surfactant:

Alkyl trimethylammonium salts, and dialkyl dimethylammonium chloride.

Amphoteric Surfactant:

Alkyl carboxybetaines.

Other Surfactant:

Fluorine type surfactants and silicone type surfactants.

The dye ink used in the present invention may preferably be one having been so controlled as to have the characteristics of dynamic surface tension as described above. In order for the dye ink to be so made as to have the characteristics of dynamic surface tension as described above, the dynamic surface tension of the ink may be controlled by using one or two or more kinds of the above surfactant.

In the present invention, of the above surfactants, it is particularly preferable to use the nonionic surfactant, in particular, a polyoxyethylene alkyl ether, to control the dynamic surface tension of the dye ink. Where such a surfactant is used, the surfactant in the dye ink may preferably be in a content (% by mass) of from 0.10% by mass or more to 2.0% by mass or less, and more preferably from 0.5% by mass or more to 2.0% by mass or less, based on the total mass of the dye ink. If it is in a content of less than 0.10% by mass, the dye ink may have a low wettability to members constituting ink channels of an ink jet recording apparatus, to cause a lowering of ejection stability. If on the other hand it is in a content of more than 2.0% by mass, the surfactant may come to be in too large content when the water in the ink has evaporated in the vicinity of ejection orifices of the ink jet recording apparatus, so that the dye ink may locally come to have a high viscosity to cause a lowering of ejection stability of the ink.

In the present invention, the above polyoxyethylene alkyl ether may particularly preferable be at least one selected from a surfactant represented by the following general formula (1) and a surfactant represented by the following general formula (2). The dye ink containing any of these surfactants can have a great change in dynamic surface tension for changes in lifetime, and hence is especially preferable in order to be kept from blurring and improve the bleeding resistance.

General formula (1)

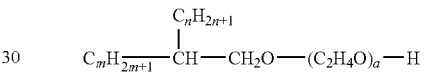

In the general formula (1), a, m and n each independently represent an integer of 1 or more, and m+n represents an integer of 14 to 20.

General formula (2)

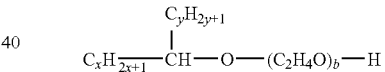

In the general formula (2), b, x and y each independently represent an integer of 1 or more, and x+y represents an integer of 12 to 21.

In the case when the surfactant represented by the general formula (2) or the general formula (2) is used, it may preferably be in a content (% by mass) of from 0.30% by mass or more to 2.0% by mass or less, and more preferably from 0.75% by mass or more to 1.5% by mass or less, based on the total mass of the dye ink. If it is in a content of less than 0.30% by mass, the dye ink may have a low wettability to the recording medium, so that the dye ink may spread on the surface of the recording medium to achieve no sufficient bleeding resistance. If on the other hand it is in a content of more than 2.0% by mass, the surfactant may come to be in too large content when the water in the dye ink has evaporated in the vicinity of ejection orifices of the ink jet recording apparatus, so that the dye ink may locally come to have a high viscosity to cause a lowering of ejection stability of the dye ink. Controlling the content of the surfactant in the dye ink within the above range enables the dye ink to be kept from blurring and improved in bleeding resistance, and further enables achievement of superior color uniformity and ejection stability.

Further, in the present invention, the above surfactant may particularly preferably have an HLB value of from 12.0 or more to 16.5 or less as measured by the Griffin method. The Griffin method is as described previously. If the surfactant has an HLB value of less than 12.0, the surfactant may be too low hydrophilic to keep, when, e.g., the dye ink is stored, the state that the surfactant has dissolved in the ink. If on the other hand the surfactant has an HLB value of more than 16.5, the surfactant may be so highly hydrophilic as to achieve no sufficient color uniformity or cause the strike through or the like of the ink when, e.g., images are continuously recorded where the dynamic surface tension of the pigment ink at a lifetime of 50 milliseconds is set within the desired range.

Aqueous Medium

The dye ink may preferably contain an aqueous medium which is a mixed solvent of water and a water-soluble organic compound. Any water-soluble organic compound may be used in the dye ink. The water-soluble organic compound in the dye ink may preferably be in a content (% by mass) of from 1.0% by mass or more to 50.0% by mass or less, and more preferably from 3.0% by mass or more to 40.0% by mass or less, based on the total mass of the dye ink.

As the water-soluble organic compound, stated specifically, the following compounds may be used, for example.

Alcohols having 1 to 6 carbon atoms, such as ethanol, isopropanol, 2-propanol, n-butanol, isobutanol, pentanol and hexanol; carboxylic acid amides such as N,N-dimethylformamide and N,N-dimethylacetamide; ketones or ketoalcohols such as acetone, methyl ethyl ketone and 2-methyl-2-hydroxypentan-4-one; cyclic ethers such as tetrahydrofuran and dioxane; alkylene glycols such as ethylene glycol, diethylene glycol, triethylene glycol, tetraethylene glycol, 1,2- or 1,3-propylene glycol, 1,2- or 1,4-butylene glycol and polyethylene glycol; polyhydric alcohols such as glycerol, 1,3-butanediol, 1,2- or 1,5-pentanediol, 1,2- or 1,6-hexanediol, 2-methyl-1,3-propanediol and 1,2,6-hexanetriol; alkyl ethers of polyhydric alcohols, such as ethylene glycol monomethyl (or -ethyl) ether, diethylene glycol monomethyl(or -ethyl) ether and triethylene glycol monoethyl(or -butyl) ether; heterocyclic rings such as 2-pyrrolidone, N-methyl-2-pyrrolidone, 1,3-diemthyl-2-imidazolidinone and N-methylmorpholine; and sulfur-containing compounds such as dimethyl sulfoxide and thiodiglycol.

In order to make the dye ink have the characteristics of dynamic surface tension of the dye ink, the dynamic surface tension of the dye ink may be controlled by using one or two or more of the water-soluble organic compounds enumerated above. In order to make the dye ink also have the characteristics of static surface tension of the dye ink, the static surface tension may be controlled by using one or two or more of the water-soluble organic compounds enumerated above.

Of the above, in order to control the static surface tension of the aqueous medium, it is particularly preferable to use a highly permeative water-soluble organic compound. Stated specifically, it is particularly preferable to use any of alcohols such as ethanol, 2-propanol, 1,2-pentanediol, 1,5-pentanediol, 1,2-hexanediol and 1,6-hexanediol.

As the water, it is preferable to use deionized water (ion-exchanged water). The water in the dye ink may preferably be in a content (% by mass) of from 30.0% by mass or more to 95.0% by mass or less based on the total mass of the dye ink, in order for the dye ink to have a viscosity suited for stable ejection of the ink and also to be an ink having been kept from any clogging at nozzle tips.

The type and content of the water-soluble organic compound making up the aqueous medium contained in a dye ink whose composition is unknown may be analyzed by gas chromatography (GC/MS) or the like. Stated specifically, for example, a sample prepared by dispensing 1 g of the dye ink whose composition is unknown and diluting it with methanol in a stated concentration is analyzed using GC/MS (trade name: TRACE DSQ; manufactured by ThermoQuest). This can identify the type and content of the water-soluble organic compound contained in the aqueous medium. The content of the water contained in the dye ink whose composition is unknown may also be identified by a conventional method, using a Karl Fischer water content meter or the like. From the type and content of the water-soluble organic compound making up the aqueous medium and the content of the water, thus determined, an aqueous medium is prepared which has like composition. Then, the static surface tension of the aqueous medium obtained is measured at 25° C. in an environment of 50% in relative humidity. The static surface tension may be measured with, e.g., an automatic surface tension meter (CBVP-Z, manufactured by Kyowa Interface Science Co., Ltd.) and by a plate method making use of a platinum plate. In the present invention, the method and the measuring instrument are by no means limited to the above, and any method may be used.

Dye

The coloring material used in the dye ink is a dye. The dye in the dye ink may preferably be in a content (% by mass) of from 0.1% by mass or more to 15.0% by mass or less, and more preferably from 1.0% by mass or more to 10.0% by mass or less, based on the total mass of the dye ink.

The dye is not particularly limited as long as it is a dye usable as a coloring material for commonly available inks for ink jet recording, as exemplified by a direct dye, an acid dye, a reactive dye and a basic dye, any of which may be used. In the following, dyes usable in the present invention are shown below by COLOR INDEX numbers or general formulas, which are classified by colors, where the dyes may include, e.g., the following. Even those not listed in COLOR INDEX may also be used as long as they are water-soluble.

Yellow Coloring Material:

C.I. Direct Yellow: 8, 11, 12, 27, 28, 33, 39, 44, 50, 58, 85, 86, 87, 88, 89, 98, 100, 110, 132, 173, etc.; C.I. Acid Yellow: 1, 3, 7, 11, 17, 23, 25, 29, 36, 38, 40, 42, 44, 76, 98, 99, etc.; and a compound represented by the following general formula (3), or a salt thereof.

General formula (3)

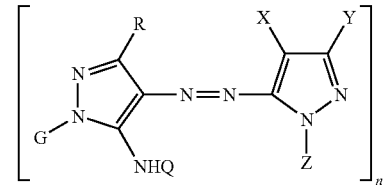

In the general formula (3), G is a hetero ring; and n is an integer of 1 to 3, where, when n is 1, R, X, Y, Z, Q and G are each a monovalent group, or when n is 2, R, X, Y, Z, Q and G are each a monovalent or divalent substituent and at least one of these is a divalent substituent, or when n is 3, R, X, Y, Z, Q and G are each a monovalent, divalent or trivalent substituent and at least two of these are each a divalent substituent or at least one of these is a trivalent substituent.

Magenta Coloring Material:

C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230, etc.; C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289, etc.; C.I. Food Red: 87, 92, 94, etc.; C.I. Direct Violet 107, etc.; other anthrapyridone compounds; other xanthene compounds; and a compound represented by the following general formula (4), or a salt thereof General formula (4)

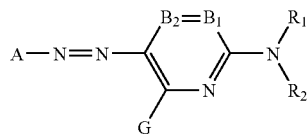

In the general formula (4), A is a five-membered heterocyclic ring; $B_1$ and $B_2$ are each independently a =$CR_3$— group or a —$CR_4$= group, or any one of $B_1$ and $B_2$ is a nitrogen atom and the other is a =$CR_3$— group or a —$CR_4$= group; $R_1$ and $R_2$ are each independently a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and any hydrogen atom(s) of these groups may be substituted; G, $R_3$ and $R_4$ are each independently a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocycloxycarbonyl group, an acyl group, a hydroxyl group, an alkoxyl group, an aryloxl group, a heterocycloxyl group, a silyloxyl group, an acyloxyl group, a carbamoyloxyl group, an alkoxycarbonyloxyl group, an aryloxycarbonyloxyl group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclosulfonylamino group, a nitro group, an alkylthio group, an arylthio group, a heterocyclothio group, an alkylsulfonyl group, an arylsulfonyl group, a heterocyclosulfonyl group, an alkylsulfinyl group, an arylsulfinyl group, a heterocyclosulfinyl group, a sulfamoyl group or a sulfonic acid group, and any hydrogen atom(s) of these groups may be substituted; and $R_3$ and $R_1$, or $R_1$ and $R_2$, may combine to form a five-membered ring or a six-membered ring.

Cyan Coloring Material:

C.I. Direct Blue: 1, 15, 22, 25, 41, 76, 77, 80, 86, 90, 98, 106, 108, 120, 158, 163, 168, 199, 226, 307, etc.; C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, 244, etc.; and a compound represented by the following general formula (5), or a salt thereof.

General formula (5)

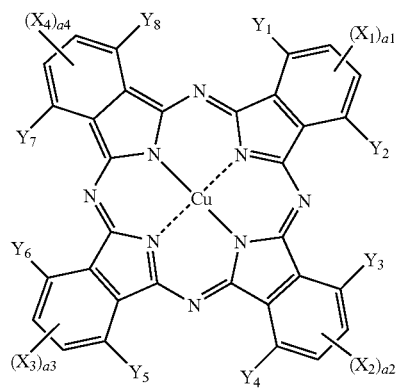

In the general formula (5), $X_1$, $X_2$, $X_3$ and $X_4$ are each independently an —SO—Z group, an —$SO_2$—Z group, an —$SO_2NR_1R_2$ group, a sulfonic acid group, a —$CONR_1R_2$ group or a —$CO_2R_1$ group, where Z's are each independently a substituted or unsubstituted alkyl group, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, and $R_1$ and $R_2$ are each independently a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $Y_1$, $Y_2$, $Y_3$, $Y_4$, $Y_5$, $Y_6$, $Y_7$ and $Y_8$ are each independently a hydrogen atom, a halogen atom, a substituted or unsubstituted alkyl group, a substituted or unsubstituted aryl group, a cyano group, a substituted or unsubstituted alkoxyl group, an amido group, a ureido group, a sulfonamido group, a substituted or unsubstituted carbamoyl group, a substituted or unsubstituted sulfamoyl group, a substituted or unsubstituted alkoxycarbonyl group, a carboxyl group or a sulfonic acid group; a1, a2, a3 and a4 each represent the number of the substituents $X_1$, $X_2$, $X_3$ and $X_4$, respectively, and are each independently an integer of 1 or 2.

Orange Coloring Material:

C.I. Acid Orange: 7, 8, 10, 12, 24, 33, 56, 67, 74, 88, 94, 116, 142, etc.; C.I. Acid Red: 111, 114, 266, 374, etc.; C.I. Direct Orange: 26, 29, 24, 39, 57, 102, 118, etc.; C.I. Direct Red 84, etc.; C.I. Food Orange 3, etc.; C.I. Reactive Orange: 1, 4, 5, 7, 12, 13, 14, 15, 16, 20, 29, 30, 84, 107, etc.; and C.I. Disperse Orange: 1, 3, 11, 13, 20, 25, 29, 30, 31, 32, 47, 55, 56, etc.

Green Coloring Material:

C.I. Acid Green: 1, 3, 5, 6, 9, 12, 15, 16, 19, 21, 25, 28, 81, 84, etc.; C.I. Direct Green: 26, 59, 67, etc.; C.I. Food Green 3, etc.; C.I. Reactive Green: 5, 6, 12, 19, 21, etc.; and C.I. Disperse Green: 6, 9, etc.

Blue Coloring Material:

C.I. Acid Blue: 62, 80, 83, 90, 104, 112, 113, 142, 203, 204, 221, 244, etc.; C.I. Reactive Blue 49, etc.; C.I. Acid Violet: 17, 19, 48, 49, 54, 129, etc.; C.I. Direct Violet: 9, 35, 47, 51, 66, 93, 95, 99, etc.; C.I. Reactive Violet: 1, 2, 4, 5, 6, 8, 9, 22, 34, 36, etc.; and C.I. Disperse Violet: 1, 4, 8, 23, 26, 28, 31, 33, 35, 38, 48, 56, etc.

Black Coloring Material:

C.I. Direct Black: 17, 19, 22, 31, 32, 51, 62, 71, 74, 112, 113, 154, 168, 195, etc.; C.I. Acid Black: 2, 48, 51, 52, 110, 115, 156, etc.; C.I. Food Black: 1, 2, etc.; and a compound represented by the following general formula (6), or a salt thereof.

General formula (6)

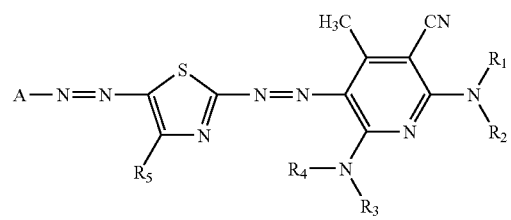

In the general formula (6), $R_1$ and $R_2$ are each independently a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, and any of these groups may further have a substituent, provided that $R_1$ and $R_2$ are not hydrogen atoms at the same time; $R_3$ and $R_4$ are each independently a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, and, of the above, $R_3$ and $R_4$ are each preferably a hydrogen atom, an aromatic group, a heterocyclic group, an acyl group or an alkyl- or arylsulfonyl group, and particularly preferably a hydrogen atom, an aromatic group or a heterocyclic group; $R_5$ is an alkyl group, an aromatic group or a heterocyclic group, and particularly preferably an aromatic group; and A is an aromatic group or heterocyclic group which may have a substituent, and particularly preferably an aromatic group. The respective groups given here may further have substituents. When these groups have substituents, the substituents may include the following: A hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocycloxycarbonyl group, an acyl group, a hydroxyl group, an alkoxyl group, an aryloxyl group, a heterocycloxyl group, a silyloxyl group, an acyloxyl group, a carbamoyloxyl group, an alkoxycarbonyloxyl group, an aryloxycarbonyloxyl group, an amino group (including an anilino group and a heterocycloamino group), an acylamino group, a ureido group, a sulfamoylamino group, an alkoxycarbonylamino group, an aryloxycarbonylamino group, an alkyl- or arylsulfonylamino group, heterocyclosulfonylamino group, a nitro group, an alkyl- or arylthio group, a heterocyclothio group, an alkyl- or arylsulfonyl group, a heterocyclosulfonyl group, an alkyl- or arylsulfinyl group, a heterocyclosulfinyl group, a sulfamoyl group and a sulfonic acid group.

Brown Coloring Material:

C.I. Reactive Brown: 1, 2, 7, 8, 9, 11, 17, 18, 21, 31, 32, 33, 46, 47, etc.

Other Components:

Besides the components shown above, the dye ink may contain a moisture-retentive solid matter such as urea, a urea derivative, trimethylol propane or trimethylol ethane in order to keep moisture retention. The moisture-retentive solid matter in the dye ink may preferably be in a content (% by mass) of from 0.1% by mass or more to 20.0% by mass or less, and more preferably from 3.0% by mass or more to 10.0% by mass or less, based on the total mass of the pigment ink.

Besides the foregoing, as long as the effect of the present invention is not damaged, the dye ink may also optionally contain various additives. As the additives, stated specifically, the following ones may be used, as exemplified by a nitrogen-containing compound such as urea or ethylene urea, a pH adjuster, a rust preventive, an anticeptic agent, a mildew-proofing agent, an antioxidant, a reduction preventive, an evaporation accelerator and a chelating agent.

—Ink Jet Recording Method—

The respective inks making up the ink set of the present invention may particularly preferably be used in an ink jet recording method in which the inks are ejected by ink jet recording. The ink jet recording method includes a recording method in which mechanical energy is made to act on an ink to eject the ink, and a recording method in which thermal energy is made to act on an ink to eject the ink. In particular, the inks making up the ink set of the present invention can be remarkably effective when used in an ink jet recording method that utilizes thermal energy.

—Ink Cartridge—

The ink cartridge of the present invention is characterized by having ink storing portions which store therein the inks making up the ink set of the present invention.

—Recording Unit—

The recording unit of the present invention is characterized by having ink storing portions which store therein the inks making up the ink set of the present invention and a recording head which ejects the inks therefrom. In particular, it can be remarkably effective when it is a recording unit in which the recording head ejects the inks therefrom by acting thermal energy on the inks.

—Ink jet Recording Apparatus—

The ink jet recording apparatus of the present invention is characterized by having ink storing portions which store therein the inks making up the ink set of the present invention and a recording head which ejects the inks therefrom. In particular, it can be remarkably effective when it is an ink jet recording apparatus in which the recording head ejects the inks therefrom by acting thermal energy on the inks.

Outline construction of the structural mechanical part of an ink jet recording apparatus is described below. The ink jet recording apparatus is, from function of each mechanism, constituted of a sheet feed part, a sheet transport part, a carriage part, a sheet delivery part, a cleaning part, and an exterior housing which protects these and provides design quality. These are schematically described below.

Figure 3:
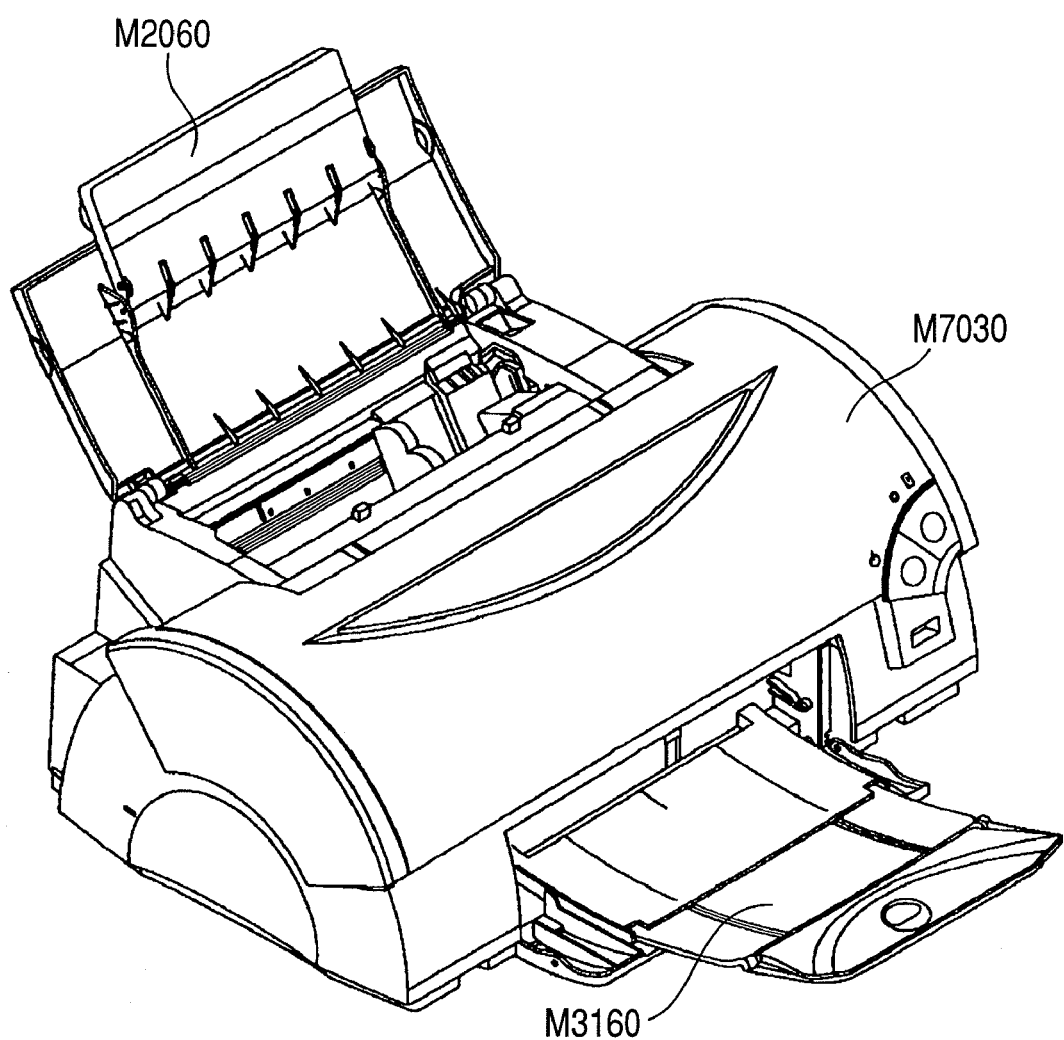
FIG. 3 is a perspective view of an ink jet recording apparatus.
Figure 4:
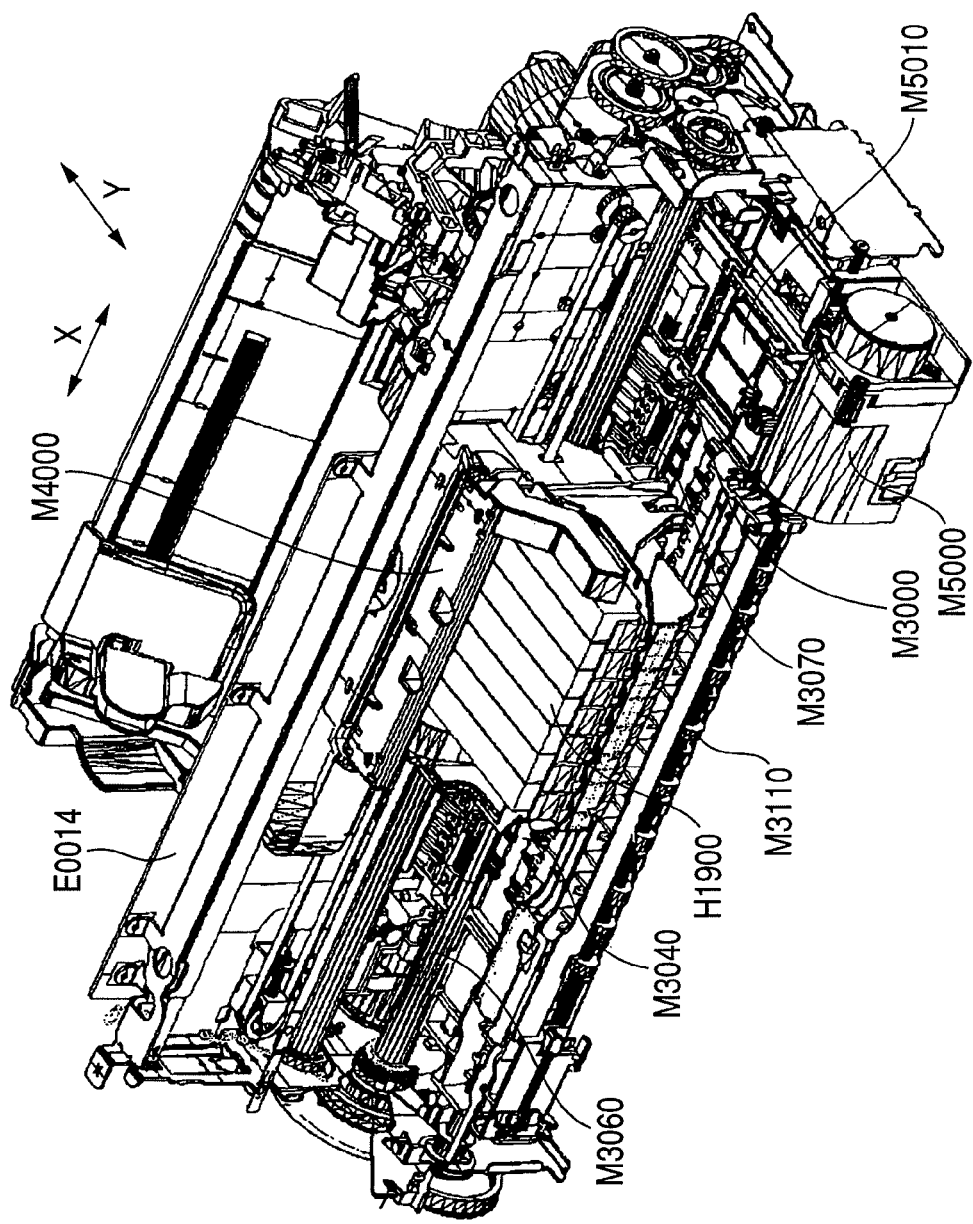
FIG. 4 is a perspective view of the structural mechanical part of the ink jet recording apparatus.
Figure 5:
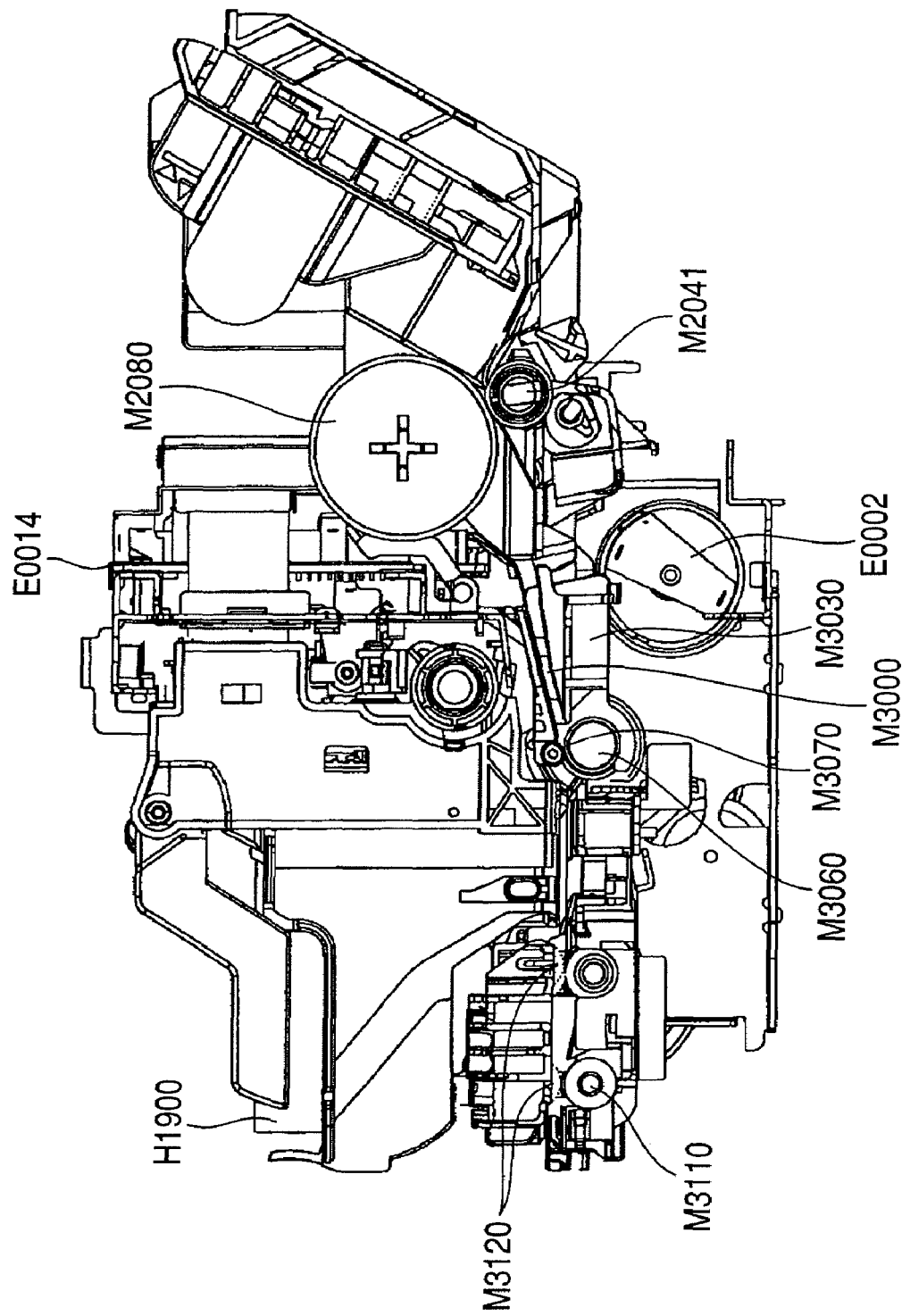
FIG. 5 is a sectional view of the ink jet recording apparatus.

FIG. 3 is a perspective view of the ink jet recording apparatus. FIGS. 4 and 5 are views to illustrate the internal mechanism of the ink jet recording apparatus. FIGS. 4 and 5 are a perspective view as viewed form the upper right and a sectional side view, respectively, of the ink jet recording apparatus.

When recording sheets are fed in the recording apparatus, first, in the sheet feed part, having a sheet feed tray M2060, a stated number of sheets of recording mediums are sent to a nip zone formed by a sheet feed roller M2080 and a separation roller M2041 (see FIGS. 3 and 5). The recording mediums thus sent are separated at the nip zone, and only the upper-most-positioned recording medium is transported. The recording medium sent to the sheet transport part is guided by a pinch roller holder M3000 and a sheet guide flapper M3030, and is sent to a pair of rollers, a transport roller M3060 and a pinch roller M3070. The pair of rollers consisting of the transport roller M3060 and the pinch roller M3070 is rotated by the drive of an LF motor E0002, and the recording medium is transported over a platen M3040 by this rotation (for the above, see FIGS. 4 and 5).

In the carriage part, when images are formed on the recording medium, a recording head H1001 (see FIG. 6) is set at the intended image forming position, and ejects inks against the recording medium in accordance with signals sent form an electric board E0014 (see FIG. 4). The recording head H1001 will be detailed later on its construction. Recording is performed by the recording head H1001, during which it repeats alternately the primary scanning in which a carriage M4000 (see FIG. 4) is scanned in the column direction and the secondary scanning in which the transport roller M3060 (see FIGS. 4 and 5) transports the recording medium in the row direction, whereby images are formed on the recording medium. Here, an image forming method in which images are formed by one-time primary scanning of the recording head on a unit region of the recording medium is one-pass recording. An image forming method in which images are formed by n-time primary scanning of the recording head on one unit region of the recording medium is n-pass recording (n is 1 or more). The above unit region refers to one pixel or one band, and unit regions may be set as various regions as occasion calls. Here, one pixel refers to one pixel corresponding to resolution, and one band refers to a region of images formed by one-time scanning of the recording head. To obtain the effect of the present invention, the ink jet recording method and the ink jet recording apparatus may particularly preferably be so set up as to include the one-pass recording.

Finally, the recording medium is inserted to a nip between a first sheet delivery roller M3110 and a spur M3120 at the sheet delivery part (see FIG. 5), is transported therethrough, and is delivered to a sheet delivery tray M3160 (see FIG. 3).

The cleaning part cleans the recording head H1001. At the cleaning part, a pump M5000 (see FIG. 4) is operated in the state a cap M5010 (see FIG. 4) is brought into contact with ink ejection orifices of the recording head H1001, whereupon inks and so forth are sucked up from the recording head H1001. It is also so designed that, in the state the cap M5010 is opened, the inks remaining in the cap M5010 are sucked up so that sticking of inks and any other difficulties may not occur.

Recording Head Construction

Figure 6:
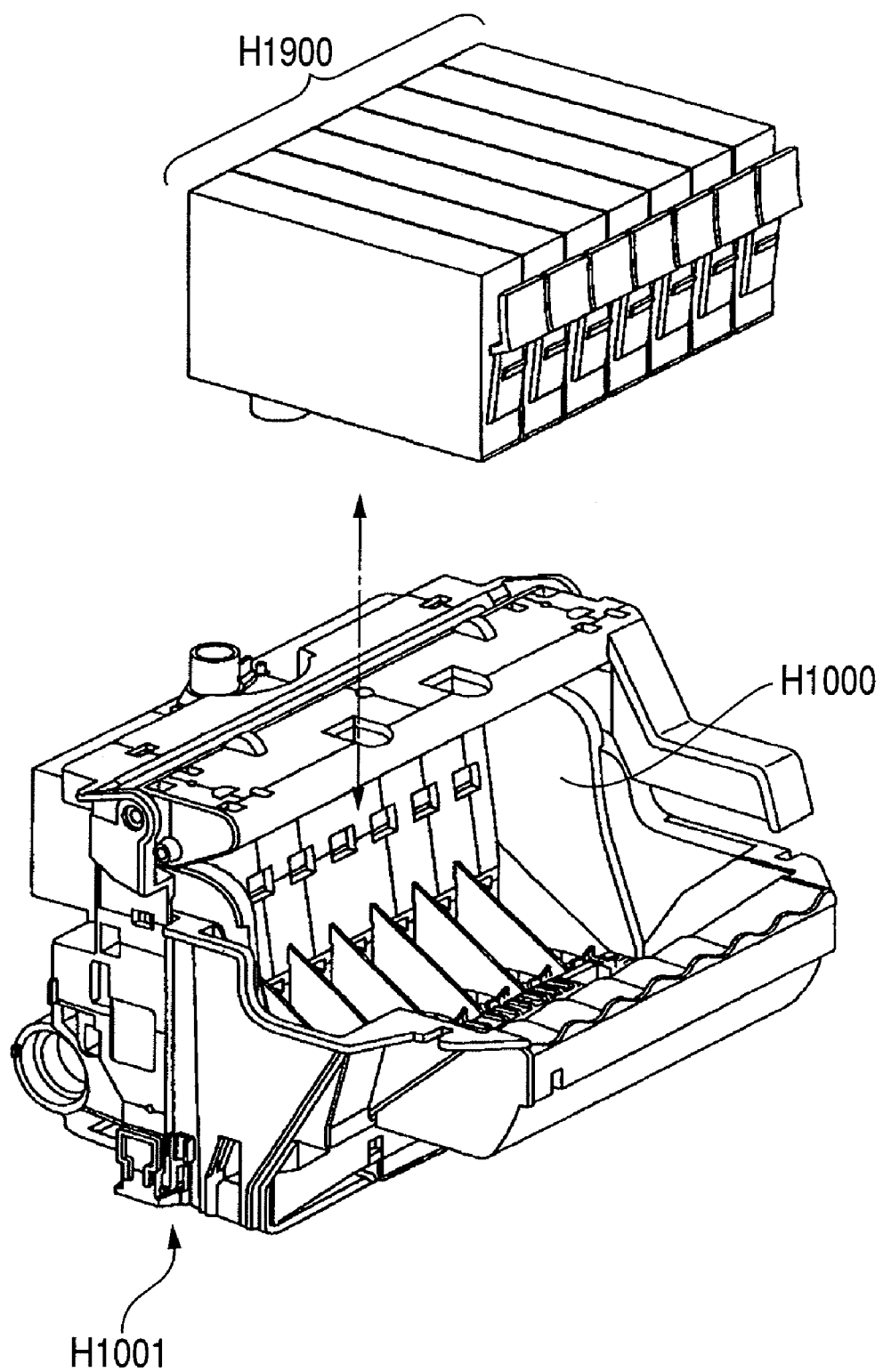
FIG. 6 is a perspective view showing how ink cartridges are attached to a head cartridge.

How a head cartridge H1000 is constructed is described (see FIG. 6). The head cartridge H1000 has the recording head H1001, a means for mounting ink cartridges denoted collectively as H1900, and a means for feeding inks from the ink cartridges H1900 to the recording head. Then the head cartridge H1000 is detachably mounted to the carriage M4000 (see FIG. 4).

FIG. 6 illustrates how the ink cartridges H1900 are attached to the head cartridge H1000. The ink jet recording apparatus forms images using, e.g., yellow, magenta, cyan, black, light magenta, light cyan and green inks. Accordingly, the ink cartridges H1900 as well are independently readied for seven colors. Then, as shown FIG. 6, each ink cartridge is set detachably to the head cartridge H1000. Here, the ink cartridges H1900 may be attached or detached in the state the head cartridge H1000 is mounted to the carriage M4000 (see FIG. 4).

Figure 7:
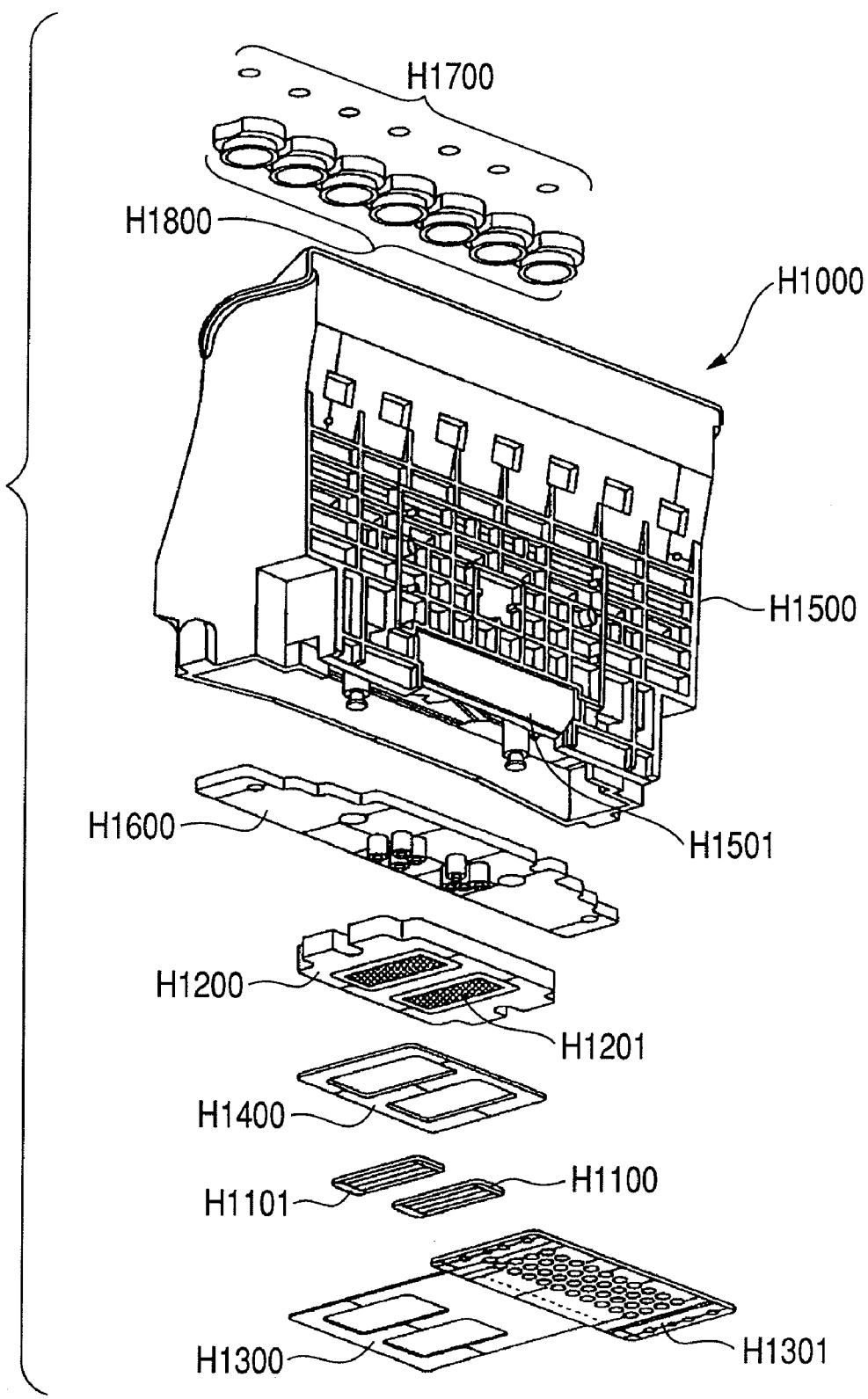
FIG. 7 is an exploded perspective view of the head cartridge.

FIG. 7 is an exploded perspective view of the head cartridge H1000. The head cartridge H1000 is constituted of a recording element board, a plate, an electric wiring circuit board H1300, an ink cartridge holder H1500, an ink channel forming member H1600, filters H1700, seal rubbers H1800 and so forth. The recording element board is constituted of a first recording element board 1100 and a second recording element board 1101. The plate is constituted of a first plate H1200 and a second plate H1400.

The first recording element board 1100 and the second recording element board 1101 are each a silicon board, on one side of which a plurality of recording elements (nozzles) for ejecting inks therefrom have been formed by photolithography. Al or the like electric wiring through which electric power is supplied to each recording element is formed by a film-forming technique. A plurality of ink channels corresponding to the individual recording elements are also formed by photolithography. Further, ink feed openings for feeding inks to the plurality of ink channels are so formed that they open on the back.

Figure 8:
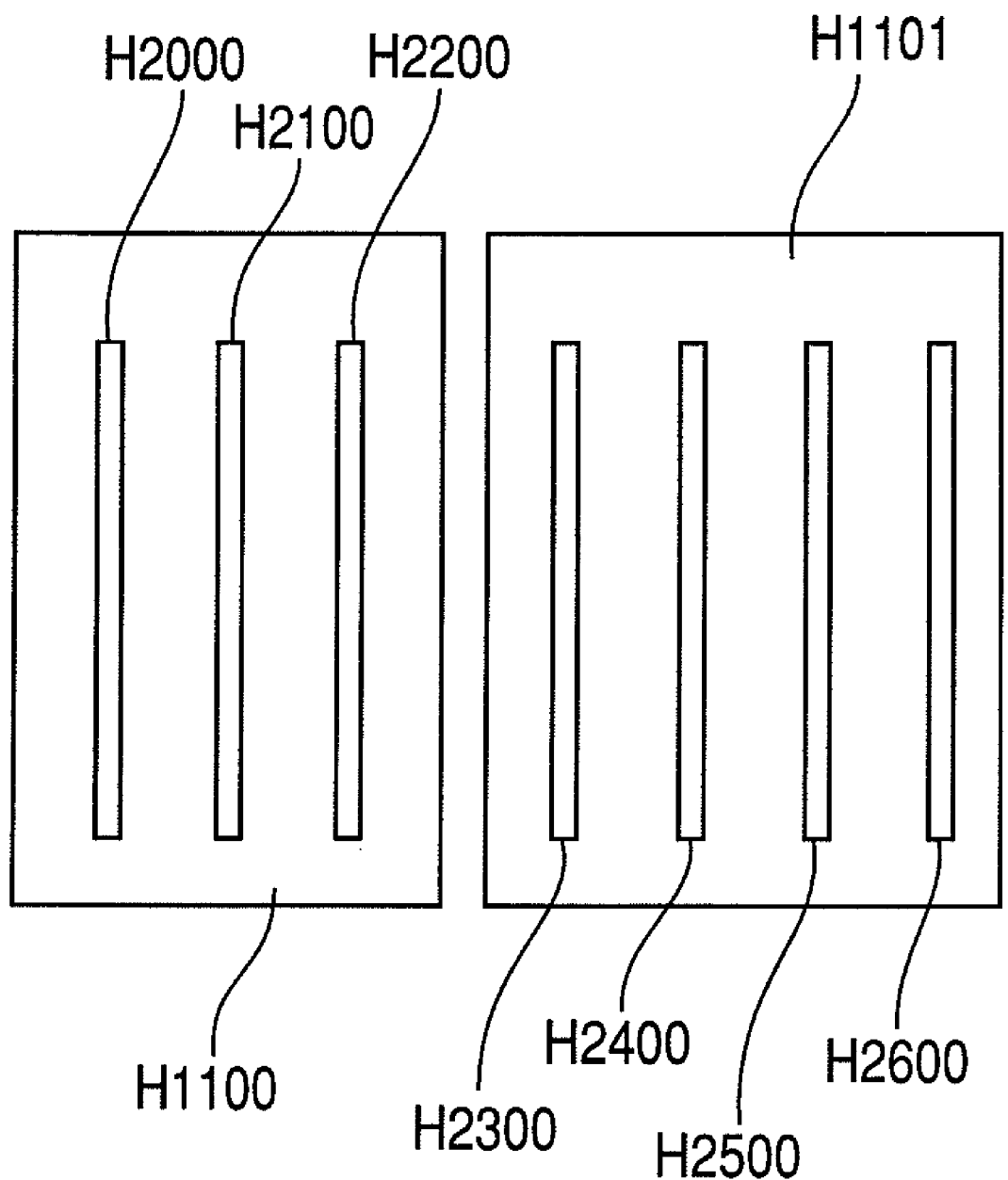
FIG. 8 is a front view showing a recording element board in the head cartridge.

FIG. 8 is an enlarged front view to illustrate the construction of the first recording element board 1100 and second recording element board 1101. Reference numerals H2000 to H2600 denote lines of recording elements (hereinafter also "nozzle line(s)") which respectively feed different inks. In the first recording element board H1100, nozzle lines for three colors are formed which are a yellow ink nozzle line H2000, a magenta ink nozzle line H2100 and a cyan ink nozzle line H2200. In the second recording element board 1101, nozzle lines for four colors are formed which are a light-cyan ink nozzle line H2300, a black ink nozzle line H2400, a green ink nozzle line H2500 and a light-magenta ink nozzle line H2600.

Each nozzle line is constituted of 768 nozzles arranged at intervals of 1,200 dpi (dot per inch; a reference value) in the direction of transport of the recording medium, and ejects about 2 picolitters of ink. Opening area of each nozzle (ejection orifice) is set to be about 100 $\mu m^2$.

The head cartridge H1000 is described below with reference to FIGS. 6 and 7. The first recording element board 1100 and the second recording element board 1101 are fastened to the first plate H1200 by bonding. In this plate, an ink feed opening H1201 is formed through which the ink is to be fed to the first recording element board H1100 and second recording element board H1101. The second plate H1400, having openings, is further fastened to the first plate H1200 by bonding. This second plate H1400 holds the electric wiring circuit board H1300 so that the electric wiring circuit board H1300 may electrically be connected with the first recording element board H1100 and second recording element board H1101.

The electric wiring circuit board H1300 applies electric signals for ejecting the inks from the respective nozzles formed in the first recording element board H1100 and second recording element board H1101. This electric wiring circuit board H1300 has electric wiring corresponding to the first recording element board H1100 and second recording element board H1101, and an external signal input terminal H1301 which is positioned at an end portion of this electric wiring and through which the electric signals from the ink jet recording apparatus are to be received. The external signal input terminal H1301 is fastened under registration to the ink cartridge holder H1500 on its back side.

To the ink cartridge holder H1500 which holds the ink cartridges H1900, the channel forming member H1600 is fastened by, e.g., ultrasonic welding to form ink channels H1501 which lead from the ink cartridges H1900 to the first plate H1200. At ink cartridge side end portions of the ink channels H1501 engaging with the ink cartridges H1900, the filters H1700 are provided so that any dust and dirt can be prevented from coming in from the outside. The seal rubbers H1800 are also fitted at the part where the ink channels H1501 engage with the ink cartridges H1900 so that the inks can be prevented from evaporating through the part of engagement.

Further, the ink cartridge holder part is joined to the recording head H1001 by bonding or the like to set up the head cartridge H1000. The ink cartridge holder part is constituted of the ink cartridge holder H1500, the channel forming member H1600, the filters H1700 and the seal rubbers H1800. The recording head H1001 is constituted of the first recording element board H1100, the second recording element board H1101, the first plate H1200, the electric wiring circuit board H1300 and the second plate H1400.

Here, as a form of the recording head, a recording head of a thermal ink jet recording system has been described in which recording is performed using an electrothermal transducer (a recording element) which produces thermal energy for causing film bubbling corresponding to electric signals. As to typical construction and principles of such a recording system, preferred is what is performed by the use of basic principles disclosed in, e.g., U.S. Pat. Nos. 4,723,129 and No. 4,740,796. This system is applicable to any of what are called an on-demand type and a continuous type.

It is especially effective for the thermal ink jet recording system to be used in the on-demand type. In the case of the on-demand type, at least one drive signal corresponding to recording information and giving rapid temperature rise that exceeds nucleate boiling is applied to an electrothermal transducer disposed correspondingly to fluid channels holding the ink therethrough. This generates thermal energy in the electrothermal transducer to cause film boiling in the ink, and consequently bubbles in ink can be formed one to one correspondingly to this drive signal. The growth and shrinkage of such bubbles cause the ink to be ejected through ejection orifices to form at least one ink droplet. Where this drive signal is applied in a pulse form, the growth and shrinkage of the bubbles take place instantly and appropriately, and hence the ejection of ink in an especially good response can be achieved, as being more preferable.

Without limitation to the above thermal ink jet recording system, the inks making up the ink set of the present invention may preferably be used also in an ink jet recording apparatus that utilizes mechanical energy, which is as described below. The ink jet recording apparatus of such a form has a nozzle-formed board having a plurality of nozzles, a pressure generating element composed of a piezoelectric material and a conductive material, provided opposingly to the nozzles, and an ink with which the surrounding of the pressure generating element is filled. Then, the pressure generating element is made to undergo displacement by an applied voltage to eject the ink from the nozzles.

The ink jet recording apparatus is not limited to the one in which the recording head and the ink cartridges are separately set up, and may also be one making use of them set integral unseparably. Further, the ink cartridges may be those which are set integral separably or unseparably from a head and mounted to a carriage, or those provided at a stationary portion of the ink jet recording apparatus and feed inks to a recording head through an ink feeding member such as tubes. Where an ink cartridge is provided with a structure for causing negative pressure to act on a recording head, it may be set up in the following way. That is, it may take a form in which an absorber is disposed in an ink storing portion of the ink cartridge, or a form in which the ink cartridge has a flexible ink holding bag and a spring member which makes a pressing force act on the bag in the direction where its internal volume is expanded. Instead, the recording apparatus may employ a serial type recording system, but may take a form of a line printer in which recording elements are arrayed over the range corresponding to the whole width of a recording medium.

EXAMPLES

The present invention is described below in greater detail by giving Examples and Comparative Examples. The present invention is by no means limited by the following Examples unless it is beyond its gist. In the following, "part(s)" and "%" are by mass unless particularly noted.

—Preparation of Pigment Dispersions—

Preparation of Pigment Dispersion A 300 g of acidic carbon black with pH 3.0 (trade name: MA77; available from Mitsubishi Chemical Corporation) was added to and thoroughly mixed in 1,000 ml of water. To the mixture obtained, 450 g of sodium hypochlorite (effective chlorine concentration: 12%) was dropwise added, and these were stirred at temperatures of 100° C. to 105° C. The slurry thus obtained was filtered with filter paper (trade name: Filter Paper No. 2 for Standard; available from Advantec Co., Ltd.), and thereafter the particles obtained were thoroughly washed with water to obtain a pigment wet cake. The pigment wet cake obtained was dispersed in 3,000 ml of water, followed by desalting with a reverse osmosis membrane until it came to have a conductivity of 0.2 μs, to obtain a pigment dispersion with pH 8 to 10. The pigment dispersion obtained was concentrated until it came to have a pigment concentration of 10% by mass. In this way, Pigment Dispersion A was obtained in which Self-dispersion Carbon Black A into carbon black particle surface portions of which —COONa groups were introduced stood dispersed in water.

Preparation of Pigment Dispersion B

To a solution prepared by dissolving 2.5 g of concentrated hydrochloric acid in 5.5 g of water, 0.8 g of p-aminobenzoic acid was added in the state the solution was cooled to 5° C. Next, a container holding this solution therein was put into an ice bath, and the solution was so stirred as to be always kept at 10° C. or less, in the state of which a solution was added thereto which was prepared by dissolving 0.9 g of sodium nitrite in 9 g of water kept at 5° C. This solution was further stirred for 15 minutes, and thereafter 9 g of carbon black having a specific surface area of 220 m$^2$/g and a DBP oil absorption of 105 mL/100 g was added with stirring, followed by further stirring for 15 minutes. The slurry thus obtained was filtered with filter paper (trade name: Filter Paper No. 2 for Standard; available from Advantec Co., Ltd.), and thereafter the particles obtained were thoroughly washed with water and then dried in a 110° C. oven to prepare a self-dispersion type carbon black. Water was further added to the self-dispersion type carbon black obtained as above and the latter was so dispersed in the former as to be in a pigment concentration of 10% by mass to prepare a dispersion. In this way, Pigment Dispersion B was obtained in which Self-dispersion Carbon Black B into carbon black particle surface portions of which —$C_6H_4$—COONa groups were introduced stood dispersed in water. The ionic-group density of Self-dispersion Carbon Black B prepared as above was measured to find that it was 1.0 μmol/m$^2$. In the ionic-group density measuring method used here, sodium ion concentration in the pigment dispersion prepared as above was measured with an ion meter (manufactured by Toa DKK). From the value obtained, the sodium ion concentration was converted into the ionic-group density of the self-dispersion type carbon black.

Preparation of Pigment Dispersion C

To a solution prepared by dissolving 5 g of concentrated hydrochloric acid in 5.5 g of water, 1.55 g of p-aminobenzoic acid was added in the state the solution was cooled to 5° C. Next, a container holding this solution therein was put into an ice bath, and the solution was so stirred as to be always kept at 10° C. or less, in the state of which a solution was added thereto which was prepared by dissolving 1.8 g of sodium nitrite in 9 g of water kept at 5° C. This solution was further stirred for 15 minutes, and thereafter 6 g of carbon black having a specific surface area of 220 m$^2$/g and a DBP oil absorption of 105 mL/100 g was added with stirring, followed by further stirring for 15 minutes. The slurry thus obtained was filtered with filter paper (trade name: Filter Paper No. 2 for Standard; available from Advantec Co., Ltd.), and thereafter the particles obtained were thoroughly washed with water and then dried in a 110° C. oven to prepare a self-dispersion type carbon black. Water was further added to the self-dispersion type carbon black obtained as above and the latter was so dispersed in the former as to be in a pigment concentration of 10% by mass to prepare a dispersion. In this way, Pigment Dispersion C was obtained in which Self-dispersion Carbon Black C (Pigment C) into carbon black particle surface portions of which —$C_6H_4$—COONa groups were introduced stood dispersed in water. The ionic-group density of Self-dispersion Carbon Black C prepared as above was measured in the same way as Self-dispersion Carbon Black B to find that it was 2.6 μmol/m².

Preparation of Pigment Dispersion D

To a solution prepared by dissolving 5 g of concentrated hydrochloric acid in 5.5 g of water, 1.5 g of 4-amino-1,2-benzenedicarboxylic acid was added in the state the solution was cooled to 5° C. Next, a container holding this solution therein was put into an ice bath, and the solution was so stirred as to be always kept at 10° C. or less, in the state of which a solution was added thereto which was prepared by dissolving 1.8 g of sodium nitrite in 9 g of water kept at 5° C. This solution was further stirred for 15 minutes, and thereafter 6 g of carbon black having a specific surface area of 220 m²/g and a DBP oil absorption of 105 mL/100 g was added with stirring, followed by further stirring for 15 minutes. The slurry thus obtained was filtered with filter paper (trade name: Filter Paper No. 2 for Standard; available from Advantec Co., Ltd.), and thereafter the particles obtained were thoroughly washed with water and then dried in a 110° C. oven to prepare a self-dispersion type carbon black. Water was further added to the self-dispersion type carbon black obtained as above and the latter was so dispersed in the former as to be in a pigment concentration of 10% by mass to prepare a dispersion. In this way, Pigment Dispersion D was obtained in which Self-dispersion Carbon Black D into carbon black particle surface portions of which —$C_6H_3$—$(COONa)_2$ groups were introduced stood dispersed in water. The ionic-group density of Self-dispersion Carbon Black D prepared as above was measured in the same way as Self-dispersion Carbon Black B to find that it was 3.1 μmol/m².

Preparation of Pigment Dispersion E 10 parts of carbon black having a specific surface area of 210 m²/g and a DBP oil absorption of 74 mL/100 g, 20 parts of a polymer solution prepared by diluting with an aqueous 10% by mass sodium hydroxide solution a styrene-acrylic acid copolymer having an acid value of 200 and a weight average molecular weight of 10,000, and 70 parts of water were mixed. The mixture thus obtained was subjected to dispersion for 1 hour by means of a sand grinder, and thereafter subjected to centrifugal treatment to remove coarse particles, followed by pressure filtration using a microfilter of 3.0 μm in pore size (available from Fuji Photo Film Co., Ltd.). In this way, Pigment Dispersion E was obtained in which carbon black stood dispersed in water by the aid of a dispersing agent (polymer). In Pigment Dispersion E obtained as above, the pigment was in a concentration of 10% by mass, the dispersing agent (polymer) was in a concentration of 20% by mass, Pigment Dispersion E had a pH of 10.0 and the pigment had a weight average particle size of 120 nm.

—Preparation of Inks—

The components shown in Table 1 below were mixed and thoroughly stirred, followed by pressure filtration using a microfilter of 3.0 μm in pore size (available from Fuji Photo Film Co., Ltd.) to prepare Inks 1 to 4, containing self-dispersion pigments.

TABLE 1

|  | Ink | | | |
|---|---|---|---|---|
|  | 1 | 2 | 3 | 4 |
| Pigment Dispersion A | 40.0 | | | |
| Pigment Dispersion B | | 40.0 | | |
| Pigment Dispersion C | | | 40.0 | |
| Pigment Dispersion D | | | | 40.0 |
| Pure water | 60.0 | 60.0 | 60.0 | 60.0 |

—Inspection of Aggregation Rate of Self-Dispersion Pigment—

Inspection of Sodium Chloride Minimum Quantity Necessary for Self-Dispersion Pigment to Change in Average Particle Size:

Regarding the inks obtained as above, the minimum quantity of sodium chloride that was necessary for the self-dispersion pigment to change in average particle size was inspected. Here, how to inspect it is specifically described taking the case of Ink 4.

The components shown in upper columns of Table 2 below were mixed to prepare liquids different from one another in the amount of the sodium chloride added. Then, the average particle size of the self-dispersion pigment in each liquid was measured with a fiber-optics particle size analyzer (trade name: FPAR-1000; manufactured by Otsuka Electronics Co., Ltd.). Results obtained are shown in a lower column of Table 2.

TABLE 2

|  | Liquid | | | | | | | | | |
|---|---|---|---|---|---|---|---|---|---|---|
|  | a | b | c | d | e | f | g | h | I | j |
| Ink 4 (g) | 40.0 | 40.0 | 40.0 | 40.0 | 40.0 | 40.0 | 40.0 | 40.0 | 40.0 | 40.0 |
| Sodium chloride (g) | 0.0 | 0.2 | 0.4 | 0.6 | 0.7 | 0.8 | 1.0 | 1.2 | 1.4 | 1.6 |
| Pure water (g) | 60.0 | 59.8 | 59.6 | 59.4 | 59.3 | 59.2 | 59.0 | 58.8 | 58.6 | 58.4 |
| Average particle size (nm) of self-dispersion pigment | 101 | 101 | 101 | 101 | 101 | 120 | 853 | 1920 | 3380 | 5650 |

As is clear from Table 2, the self-dispersion pigment did not change in average particle size when the sodium chloride was added in the amounts in Liquids a to e. Meanwhile, when the sodium chloride was added in the amount (0.8 g) in Liquid f, the self-dispersion pigment was seen to change in average particle size. As the result, in Ink 4, Liquid e was judged to come under a liquid containing the sodium chloride in the minimum quantity necessary for the self-dispersion pigment to change in average particle size. This Liquid e was designated as Liquid 4, containing the sodium chloride in the minimum quantity necessary for the self-dispersion pigment of Ink 4 to change in average particle size.

Inspection was made in the same way as the above also in regard to Inks 1 to 3 to obtain Liquids 1 to 3, each containing the sodium chloride in the minimum quantity necessary for the self-dispersion pigment to change in average particle size. The sodium chloride in Liquids 1 to 3 was in a content of 0.2 g for Liquid 1, 0.5 g for Liquid 2 and 1.1 g for Liquid 3. The number of the liquid corresponds to the number of the ink.

Changes in Average Particle Size of Self-Dispersion Pigment which are Caused by Evaporation:

Liquids 1 to 4 (noted "initial liquids") obtained as above were left in an environment of a temperature of 30° C. and a relative humidity of 10% to allow the water in the liquids to evaporate. Then, the average particle size of the self-dispersion pigment in each liquid was measured at points of time where the evaporation rate (%) determined according to the following expression (A) came to 30% and 50%.

Evaporation rate (%)=[{mass (g) of initial liquid (ink)−mass (g) of liquid (ink) after evaporation)}/mass (g) of initial liquid (ink)]×100. Expression (A)

Further, from the values of average particle size of the self-dispersion pigment in the initial liquid (i.e., evaporation rate of 0%) and in the liquid having come to the evaporation rate of 30%, the increase rate $A_1$ of the average particle size, was found according to the following expression (1). From the values of average particle size of the self-dispersion pigment in the initial liquid (i.e., evaporation rate of 0%) and in the liquid having come to the evaporation rate of 50%, the increase rate $A_2$ of the average particle size, was found according to the following expression (2).

Increase rate $A_1$ of average particle size=(Average particle size of self-dispersion pigment at evaporation rate of 30%)/(Average particle size of self-dispersion pigment at evaporation rate of 0%). Expression (1)

Increase rate of average particle size, $A_2$=(Average particle size of self-dispersion pigment at evaporation rate of 50%)/(Average particle size of self-dispersion pigment at evaporation rate of 0%). Expression (2)

From the values obtained as above, the value of $A_1$, the value of $A_2$ and the value of $(5/3) \times A_1$ were found. It was also examined whether or not the respective liquids satisfy the relationships of $A_1 \geq 15$ and $A_2 > (5/3) \times A_1$. Results obtained are shown in Table 3. In Table 3, a case in which the liquid satisfies the relationships is shown as "Y", and a case in which the liquid does not satisfy the relationships as "N".

TABLE 3

|  |  | Liquid | | | |
| --- | --- | --- | --- | --- | --- |
|  |  | 1 | 2 | 3 | 4 |
| Average particle size (nm) of self-dispersion pigment at each evaporation rate | Initial | 273 | 288 | 133 | 120 |
|  | Evaporation rate of 30% | 1147 | 3802 | 3032 | 1908 |
|  | Evaporation rate of 50% | 1638 | 5414 | 3591 | 6828 |
| Increase rate of average particle size | $A_1$ (30%) | 4.2 | 13.2 | 22.8 | 15.9 |
|  | $A_2$ (50%) | 6.0 | 18.8 | 27.0 | 56.9 |
| $(5/3) \times A_1$ |  | 7.0 | 22.0 | 38.0 | 26.5 |
| $A_1 \geq 15$ |  | N | N | Y | Y |
| $A_2 > (5/3) \times A_1$ |  | N | N | N | Y |

—Good Medium/Poor Medium Judgment on Water-Soluble Organic Compound—

The following experiment was conducted in order to select the water-soluble organic solvent acting as the poor medium or good medium for the pigment contained in each of the above Pigment Dispersions A to D. First, using the dispersions each (pigment concentration: 10% by mass), Dispersion A and Aqueous Dispersion B both for good medium/poor medium judgment were prepared in the following mixing ratio.

Mixing Ratio of Dispersions

Dispersion A:

| Each pigment dispersion (pigment concentration: 10% by mass) | 50 parts |
| --- | --- |
| Each water-soluble organic solvent shown in Table 1 | 50 parts |

Aqueous Dispersion B:

| Each pigment dispersion (pigment concentration: 10% by mass) | 50 parts |
| --- | --- |
| Pure water | 50 parts |

How to Judge and Results of Judgment

Next, 10 g each of Dispersion A and Aqueous Dispersion B which were prepared as above were each put into a transparent sample bottle having a lid made of glass, and this was closed. Thereafter, its contents were thoroughly stirred, and this was left at 60° C. for 48 hours. Thereafter, each Dispersion A cooled to room temperature was used as a sample for measurement, and the average particle size of the pigment in Dispersion A was measured with a fiber-optics particle analyzer (trade name: FPAR-1000; manufactured by Otsuka Electronics Co., Ltd.). The average particle size of the pigment in each Aqueous Dispersion B cooled to room temperature was also measured in the same way as the above. Where, in Dispersion A and Aqueous Dispersion B both having been stored at 60° C. for 48 hours, the average particle size of the pigment became larger in Dispersion A than that in Aqueous Dispersion B, the water-soluble organic compound was judged to be the poor medium. Where, in those having been stored at 60° C. for 48 hours, the average particle size of the pigment in Dispersion A was equal to or smaller than that in Aqueous Dispersion B, the water-soluble organic compound was judged to be not the poor medium, i.e., be the good medium.

Table 4 shows the results of the judgment made by measuring the average particle sizes of the pigments as above, as to which solvent each water-soluble organic compound comes under, i.e., either the poor medium or the good medium. In Table 4, the results are shown as "P" for a case in which the increase in average particle size of the pigment was seen and the water-soluble organic compound was judged to be the poor medium, and as "G" for a case in which the increase in average particle size of the pigment was seen and the water-soluble organic compound was judged to be the good medium.

TABLE 4

|  | Pigment Dispersion | | | |
| --- | --- | --- | --- | --- |
|  | A | B | C | D |
| Glycerol | G | G | G | G |
| Ethylene glycol | G | G | G | G |
| Trimethylolpropane | G | G | G | G |
| Polyethylene glycol (*1) | P | P | P | P |

(*1): (weight average molecular weight: 600)

HLB Value and Structure of Surfactant

The HLB value of the surfactant was determined. Stated specifically, on the main component of each surfactant, the HLB value was calculated by using the Griffin method (the following expression (3)). The results are shown in Table 5.

$$HLB = 20 \times (\text{formular weight of the hydroxyl group of surfactant})/(\text{molecular weight of the surfactant}) \quad (3)$$

In Table 5, also shown together are the structure of the main component of each surfactant; when the surfactant is a polyoxyethylene alkyl ether, the number of carbon atoms of its alkyl group and what the alkyl group denotes; and when the structure of the surfactant comes under the general formula (1), the values of m, n, a and m+n. In Table 5, EMULMIN CC-100, EMULMIN NL90, EMULMIN NL70 and EMULMIN L380 are surfactants available from Sanyo Chemical Industries, Ltd. EMALEX 720, EMALEX 1615, EMALEX 1625 and EMALEX 1815 are surfactants available from Nihon Emulsion Co., Ltd. ACETYLENOL E100 is a surfactant available from Kawaken Fine Chemicals Co., Ltd.)

TABLE 5

|  | HLB value | Structure of surfactant | Number of carbon atoms of alkyl group | General formula (1) m | n | a | m + n |
|---|---|---|---|---|---|---|---|
| EMULMIN CC-100 | 12.9 | Polyoxyethylene cetyl ether | 16 (cetyl group) | — | — | — | — |
| EMULMIN NL90 | 13.6 | Polyoxyethylene lauryl ether | 12 (lauryl group) | — | — | — | — |
| EMULMIN NL70 | 12.5 | Polyoxyethylene lauryl ether | 12 (lauryl group) | — | — | — | — |
| EMULMIN L380 | 18.0 | Polyoxyethylene lauryl ether | 12 (lauryl group) | — | — | — | — |
| EMALEX 720 | 16.5 | Polyoxyethylene lauryl ether | 12 (lauryl group) | — | — | — | — |
| EMALEX 1615 | 14.7 | Polyoxyethylene isocetyl ether | — | 8 | 6 | 15 | 14 |
| EMALEX 1625 | 16.4 | Polyoxyethylene isocetyl ether | — | 8 | 6 | 25 | 14 |
| EMALEX 1815 | 14.2 | Polyoxyethylene isostearyl ether | — | 9 | 7 | 15 | 16 |
| ACETYLENOL E100 | 13.3 | Acetylene glycol ethylene oxide adduct | — | — | — | — | — |

—Preparation of Pigment Inks—

The components shown in Table 6 below were mixed and thoroughly stirred, followed by pressure filtration using a microfilter of 3.0 μm in pore size (available from Fuji Photo Film Co., Ltd.) to prepare Pigment Inks P-1 to P-13. In Table 6, EMULMIN NL90 and EMULMIN L380 are surfactants available from Sanyo Chemical Industries, Ltd. EMALEX 720 is a surfactant available from Nihon Emulsion Co., Ltd. ACETYLENOL E100 is a surfactant available from Kawaken Fine Chemicals Co., Ltd.)

TABLE 6

(Unit: %)

| | Pigment Ink | | | | | | | | | | | | |
|---|---|---|---|---|---|---|---|---|---|---|---|---|---|
| | P-1 | P-2 | P-3 | P-4 | P-5 | P-6 | P-7 | P-8 | P-9 | P-10 | P-11 | P-12 | P-13 |
| Pigment Dispersion A | | 45.00 | | | | | | | | | | | |
| Pigment Dispersion B | | | 45.00 | | | | | | | | | | |
| Pigment Dispersion C | | | | 45.00 | | | | | | | | | |
| Pigment Dispersion D | 45.00 | | | | 45.00 | 45.00 | 45.00 | 45.00 | | 45.00 | 45.00 | 45.00 | 45.00 |
| Pigment Dispersion E | | | | | | | | | 45.00 | | | | |
| Glycerol | 8.00 | 8.00 | 8.00 | 8.00 | 8.00 | 8.00 | 8.00 | 8.00 | 7.00 | 8.00 | 8.00 | 8.00 | 8.00 |
| Ethylene glycol | | | | | | 5.00 | | 5.00 | 5.00 | 5.00 | 5.00 | | |
| Trimethylolpropane | | | | | | 10.00 | | 10.00 | | 10.00 | 10.00 | | |
| Polyethylene glycol (*1) | 23.00 | 23.00 | 23.00 | 23.00 | 23.00 | | 23.00 | | 5.00 | | | 23.00 | 23.00 |
| Ammonium benzoate | | | | | | 1.00 | | 1.00 | 1.00 | | 1.00 | | |
| EMULMIN NL90 | | 0.50 | 0.50 | 0.30 | 0.10 | 0.10 | | 0.15 | 0.75 | 0.15 | 0.20 | 0.18 | |
| EMULMIN L380 | 0.10 | | | | | | | | | | | | |
| EMALEX 720 | | | | | | | 0.10 | | | | | | |
| ACETYLENOL E100 | | | | | | | | | | | | | 0.10 |
| Ion-exchanged water | 23.90 | 23.50 | 23.50 | 23.70 | 23.90 | 30.90 | 23.90 | 30.85 | 36.25 | 31.85 | 30.80 | 23.82 | 23.90 |

(*1): (weight average molecular weight: 600)

—Preparation of Dye Inks—

The components shown in Table 7 below were mixed and thoroughly stirred, followed by pressure filtration using a microfilter of 0.2 μm in pore size (available from Advantec Co., Ltd.) to prepare Dye Inks D-1 to D-10. In Table 7, EMULMIN CC-100, EMULMIN NL90 and EMULMIN NL70 are surfactants available from Sanyo Chemical Industries, Ltd. EMALEX 1615, EMALEX 1625 and EMALEX 1815 are surfactants available from Nihon Emulsion Co., Ltd. ACETYLENOL E100 is a surfactant available from Kawaken Fine Chemicals Co., Ltd.)

TABLE 7

(Unit: %)

| | Dye Ink | | | | | | | | | |
|---|---|---|---|---|---|---|---|---|---|---|
| | D-1 | D-2 | D-3 | D-4 | D-5 | D-6 | D-7 | D-8 | D-9 | D-10 |
| C.I. Direct Yellow 132 | 3.00 | 3.00 | 3.00 | 3.00 | 3.00 | 3.00 | 3.00 | 3.00 | 3.00 | 3.00 |
| Glycerol | 10.00 | 10.00 | 10.00 | 10.00 | 10.00 | 10.00 | 10.00 | 10.00 | 10.00 | 10.00 |
| Diethylene glycol | 5.00 | 5.00 | 5.00 | 5.00 | 5.00 | 5.00 | 5.00 | 5.00 | 5.00 | 7.00 |
| 2-Pyrrolidone | 5.00 | 5.00 | 5.00 | 5.00 | 5.00 | 5.00 | 5.00 | 4.00 | 5.00 | |
| 1,2-Hexanediol | | | | 1.50 | | | | 1.00 | | |
| 1,5-Pentanediol | | | 2.00 | | | | | | | 3.00 |
| EMULMIN CC-100 | | | | | 0.30 | 0.20 | 0.70 | | | |
| EMULMIN NL90 | | | | | | | | | | 0.20 |
| EMULMIN NL70 | | | | | 0.70 | 0.80 | 0.30 | 0.10 | | |
| EMALEX 1615 | 0.80 | | 0.30 | | | | | | | |
| EMALEX 1625 | | 2.00 | | | | | | | | |
| EMALEX 1815 | | | | 1.20 | | | | | | |
| ACETYLENOL E100 | | | | | | | | | 1.00 | |
| Ion-exchanged water | 76.20 | 75.00 | 74.70 | 74.30 | 76.00 | 76.00 | 76.00 | 76.90 | 77.00 | 76.80 |

—Evaluation—

Measurement of Dynamic Surface Tension

Regarding the respective inks obtained as above, the dynamic surface tension of each ink at 25° C. was measured. An instrument making measurement by the maximum bubble pressure method (Bubble Pressure Tensiometer BP2; manufactured by A. KRUSS Optronic GmbH) was used to make the measurement. As to the pigment inks, (1) the dynamic surface tension at a lifetime of 50 milliseconds and (2) that at a lifetime of 5,000 milliseconds were measured. As to the dye inks, (1) the dynamic surface tension at a lifetime of 50 milliseconds and (2) that at a lifetime of 500 milliseconds were measured, and further the difference in dynamic surface tension in (1) and (2), $\Delta\gamma[(1)-(2)]$, was determined. The results of measurement of dynamic surface tension of each pigment ink and the results of measurement of dynamic surface tension of each dye ink are shown in Table 8 and Table 9, respectively.

TABLE 8

| | Dynamic surface tension of pigment ink (mN/m) | |
|---|---|---|
| | (1) Lifetime of 50 msec. | (2) Lifetime of 5,000 msec. |
| P-1 | 52 | 46 |
| P-2 | 51 | 34 |
| P-3 | 52 | 32 |
| P-4 | 50 | 33 |
| P-5 | 51 | 32 |
| P-6 | 51 | 32 |
| P-7 | 51 | 40 |
| P-8 | 48 | 32 |
| P-9 | 67 | 60 |
| P-10 | 48 | 32 |
| P-11 | 45 | 32 |
| P-12 | 47 | 32 |
| P-13 | 45 | 42 |

TABLE 9

| | Dynamic surface tension of dye ink (mN/m) | | |
|---|---|---|---|
| | (1) Lifetime of 50 msec. | (2) Lifetime of 500 msec. | $\Delta\gamma[(1)-(2)]$ |
| D-1 | 48 | 35 | 13 |
| D-2 | 45 | 38 | 7 |
| D-3 | 48 | 38 | 10 |
| D-4 | 45 | 38 | 7 |
| D-5 | 44 | 37 | 7 |
| D-6 | 43 | 37 | 6 |
| D-7 | 49 | 42 | 7 |
| D-8 | 41 | 34 | 7 |
| D-9 | 38 | 36 | 2 |
| D-10 | 42 | 35 | 7 |

Evaluation of Image Density and Bleeding Resistance

The pigment inks and dye inks obtained as above were each filled in an ink cartridge. Then, the ink cartridges obtained were each set in an altered apparatus of an ink jet recording apparatus iP3100 (manufactured by CANON INC.), from a recording head of which the ink is ejected by the action of thermal energy. Thereafter, images (detailed later) were formed on the recording mediums shown below.

A default mode was used in a printer driver.

Type of paper: Plain paper.

Print quality: Standard.

Color control: Automatic.

As the recording mediums, the following four types of plain paper were used.

PPC paper, Office Planner (available from CANON INC.).

PPC paper, 4024 (available from Xerox Corporation).

PPC paper, Bright White (available from Hewlett-Packard Development Company, L.P.).

PPC paper, Hammer Mill Jet Print (available from International Paper Company).

Image Density:

Solid images (images in a recording duty of 100%) of 2 cm×2 cm in size were formed using each pigment ink shown on the left side of Table 10 below. Ejection quantity per dot of ink was set within 24 ng±10%. Recorded images obtained were left for a day and thereafter the image density of the solid images was measured with a reflection densitometer (trade name: MACBETH RD-918; manufactured by Gretag Macbeth Ag) to evaluate the image density. The image density was evaluated according to criteria as shown below. The results of evaluation are shown in Table 10.

AAA: The image density on the four types of paper is 1.40 or more on the average, and further the image density on any two or more types of paper is 1.50 or more on the average and also the minimum value of the image density among the four types of paper is 1.35 or more.

AA: The image density on the four types of paper is 1.40 or more on the average, and further the image density on only one type of paper is 1.50 or more on the average and also the minimum value of the image density among the four types of paper is 1.35 or more.

A: The image density on the four types of paper is 1.40 or more on the average and also the minimum value of the image density among the four types of paper is from 1.30 or more to less than 1.35.

B: The image density on the four types of paper is 1.40 or more on the average and also the minimum value of the image density among the four types of paper is from 1.25 or more to less than 1.30.

C: The image density on the four types of paper is less than 1.40 on the average and also the minimum value of the image density among the four types of paper is less than 1.25.

Bleeding Resistance:

The pigment inks and dye inks shown on the right side of Table 10 below were used in combination as ink sets. Then, for each ink set, images were formed in which solid images formed in a recording duty of 100% using the pigment ink and solid images formed in recording duties of 100%, 80% and 50% using the dye ink adjoin one another. Here, the images were formed by one-pass recording in which the pigment ink and the dye ink were simultaneously applied by one-time scanning of a recording head. Ejection quantity per dot of ink was set within 24 ng±10% for the pigment ink and within 5 ng±10% for the dye ink. In the recorded images obtained, the extent of any bleeding at boundaries between regions of the images formed using the pigment ink and regions of the images formed in each recording duty using the dye ink was visually observed to evaluate the bleeding resistance. The bleeding resistance was evaluated according to criteria as shown below. The results of evaluation for each recording duty of the dye ink are shown in Table 10.

A: No bleeding is seen on all the four types of paper.

B: Bleeding is seen on some types of paper among the four types of paper, but it is at a very low level (slight).

C: Bleeding is seen on all the four types of paper, but it is at a tolerable level.

D: Bleeding is seen which is to such an extent that the boundaries of images are unclear on some types of paper among the four types of paper.

From the results of the evaluation made as above on the bleeding resistance for each recording duty of the dye ink, overall evaluation was also made on the bleeding resistance. The overall evaluation was made according to criteria as shown below. The results of evaluation are shown in Table 10.

A: The bleeding resistance is good in any recording duty, or bleeding is seen in some of the recording duties but at a tolerable level.

B: Bleeding is seen in any recording duty but at a tolerable level.

C: Bleeding is seen in any recording duty and at an undesirable level.

TABLE 10

| | | Evaluation of image density | | | | Evaluation of bleeding resistance | | | |
|---|---|---|---|---|---|---|---|---|---|
| | | | | | | Evaluation results of dye ink in each recording duty | | | Overall |
| | | Pigment Ink | Evaluation results | Pigment Ink | Dye Ink | 100% | 80% | 50% | evaluation |
| Example | 1 | P-1 | AAA | P-1 | D-1 | C | B | A | A |
| | 2 | P-2 | AA | P-2 | D-1 | C | B | B | A |
| | 3 | P-3 | AA | P-3 | D-1 | C | B | B | A |
| | 4 | P-4 | AAA | P-4 | D-1 | B | B | A | A |
| | 5 | P-5 | AAA | P-5 | D-1 | A | A | A | A |
| | 6 | P-6 | AAA | P-6 | D-1 | A | A | A | A |
| | 7 | P-7 | AAA | P-7 | D-1 | A | A | A | A |
| | 8 | P-5 | AAA | P-5 | D-2 | B | A | A | A |

TABLE 10-continued

|  |  | Evaluation of image density | | Evaluation of bleeding resistance | | | | | |
|---|---|---|---|---|---|---|---|---|---|
|  |  |  |  |  |  | Evaluation results of dye ink in each recording duty | | | |
|  |  | Pigment Ink | Evaluation results | Pigment Ink | Dye Ink | 100% | 80% | 50% | Overall evaluation |
|  | 9 | P-5 | AAA | P-5 | D-3 | A | A | A | A |
|  | 10 | P-5 | AAA | P-5 | D-4 | B | A | A | A |
|  | 11 | P-5 | AAA | P-5 | D-5 | B | A | A | A |
|  | 12 | P-5 | AAA | P-5 | D-6 | C | A | A | A |
|  | 13 | P-4 | AAA | P-4 | D-6 | C | B | A | A |
|  | 14 | P-3 | AA | P-3 | D-6 | C | C | B | A |
|  | 15 | P-5 | AAA | P-5 | D-7 | C | C | C | B |
|  | 16 | P-5 | AAA | P-5 | D-8 | C | C | C | B |
|  | 17 | P-5 | AAA | P-5 | D-9 | C | C | C | B |
|  | 18 | P-5 | AAA | P-5 | D-10 | B | A | A | A |
|  | 19 | P-8 | AAA | P-8 | D-3 | A | A | A | A |
| Comparative Example | 1 | P-9 | A | P-9 | D-1 | D | D | D | C |
|  | 2 | P-10 | B | P-10 | D-1 | D | D | C | C |
|  | 3 | P-11 | B | P-11 | D-1 | D | C | C | C |
|  | 4 | P-12 | B | P-12 | D-1 | D | C | C | C |
|  | 5 | P-13 | B | P-13 | D-1 | D | D | C | C |
|  | 6 | P-12 | B | P-12 | D-6 | D | D | C | C |
|  | 7 | P-10 | B | P-10 | D-6 | D | D | D | C |

It is seen from Table 10 that the ink sets of Examples 1 to 19, which contain pigment inks each containing the salt and/or the poor medium and also having the characteristics of dynamic surface tension as specified in the present invention, are superior in image density and bleeding resistance. It is also seen therefrom that the ink sets of Examples 4 and 5, which contain pigment inks each containing the self-dispersion pigment having a specific aggregation rate, can achieve image density and bleeding resistance which are more superior to the ink sets of Examples 2 and 3. It is still also seen therefrom that the ink sets of Examples 5 and 6, which contain pigment inks each containing the salt and/or the poor medium and the self-dispersion pigment having a specific aggregation rate and also having the characteristics of dynamic surface tension as specified in the present invention, are especially superior in image density and bleeding resistance.

As is seen in comparing Examples 1 and 7, it is seen that the ink set of Example 7, which contains the pigment ink having a dynamic surface tension of 40 mN/m or less at a lifetime of 5,000 milliseconds is especially remarkably improved in bleeding resistance. In particular, the ink set of Example 7 has been seen to be kept from the bleeding with undertrapping that may especially remarkably occur in regions where the dye ink is applied in a high recording duty.

As is seen in comparing Examples 5 and 8 to 14, it is seen that the ink sets containing dye inks having the larger difference in dynamic surface tension of the dye ink between that at the lifetime of 50 milliseconds and that at the lifetime of 500 milliseconds are the more greatly effective in keeping the ink from blurring. In particular, the ink sets containing dye inks having the larger difference in dynamic surface tension of the dye ink between that at the lifetime of 50 milliseconds and that at the lifetime of 500 milliseconds are the more improved in bleeding resistance when the dye ink is applied in a high recording duty.

As is seen in comparing Examples 5, 8 to 12 and 15 to 17, it is seen that the ink sets containing dye inks the dynamic surface tension of which at a lifetime of 50 milliseconds has been specified are especially improved in the bleeding resistance. On the other hand, the inks sets of Comparative Examples 1 to 7, which contain pigment inks each having a low dynamic surface tension of the pigment ink at a lifetime of 50 milliseconds, not containing the salt and/or the poor medium, or containing the polymer dispersion pigment, can not achieve any sufficient image density and bleeding resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-126631, filed May 11, 2007, and Japanese Patent Application No. 2008-112757, filed Apr. 23, 2008 which are hereby incorporated by reference herein in their entirety.

What is claimed is:

1. An ink set comprising:
   a plurality of inks including a pigment ink and a dye ink,
   wherein the pigment ink comprises at least water, a surfactant, a self dispersion pigment, and at least one of a poor medium for self-dispersion pigment and a salt,
   wherein the surfactant of the pigment ink is polyoxyethylene alkyl ether,
   wherein a dynamic surface tension, at 25° C., of the pigment ink at a lifetime of 50 milliseconds is higher than 47 mN/m,
   wherein the dye ink comprises at least water, a surfactant, and a dye, and
   wherein a content (% by mass) of the surfactant in the pigment ink is from 0.10% by mass or more to 0.75% by mass or less based on the total mass of the pigment ink.

2. The ink set according to claim 1, wherein the self-dispersion pigment is a self-dispersion pigment of which the increase rate $A_1$ of the average particle size, that is found according to the following expression (1) of which satisfies the requirement of $A_1 \geq 15$ at an evaporation rate of 30%, when a liquid containing sodium chloride in a minimum quantity necessary for the self-dispersion pigment to change in average particle size is prepared by using the pigment ink and when the liquid is made to evaporate on $$\text{Increase rate } A_1 \text{ of average particle size} = (\text{Average particle size of self-dispersion pigment at evaporation rate of 30\%})/(\text{Average particle size of self-dispersion pigment at evaporation rate of 0\%}) \quad \text{Expression (1)}.$$

3. The ink set according to claim 2, wherein the self-dispersion pigment is a self-dispersion pigment of which the increase rate $A_2$ of the average particle size, that is found according to the following expression (2) of which satisfies the requirement of $A_2 > (5/3) \times A_1$ at an evaporation rate of 50% when the liquid is made to evaporate on $$\text{Increase rate } A_2 \text{ of average particle size} = (\text{Average particle size of self-dispersion pigment at evaporation rate of 50\%})/(\text{Average particle size of self dispersion pigment at evaporation rate of 0\%}) \quad \text{Expression (2)}.$$

4. The ink set according to claim 1, wherein a dynamic surface tension of the dye ink at a lifetime of 50 milliseconds is from 42 mN/m or more to less than 49 mN/m.

5. The ink set according to claim 1, wherein the difference in dynamic surface tension of the dye ink between that at a lifetime of 50 milliseconds and that at a lifetime of 500 milliseconds is 7 mN/m or more.

6. An ink jet recording method in which inks are ejected by an ink jet method, wherein the inks are the pigment ink and the dye ink which constitute the ink set according to claim 1.

7. The ink jet recording method according to claim 6, wherein the ink jet method is an ink jet recording method in which thermal energy is made to act on an ink to eject the ink.

8. An ink cartridge comprising ink storing portions which store inks therein, wherein the inks stored in the ink storing portions are the pigment ink and the dye ink which constitute the ink set according to claim 1.

9. A recording unit comprising ink storing portions which store inks therein and a recording head which ejects the inks therefrom, wherein the inks stored in the ink storing portions are the pigment ink and the dye ink which constitute the ink set according to claim 1.

10. An ink jet recording apparatus comprising ink storing portions which store inks therein and a recording head which ejects the inks therefrom, wherein the inks stored in the ink storing portions are the pigment ink and the dye ink which constitute the ink set according to claim 1.

11. The ink set according to claim 1, wherein a dynamic surface tension of the pigment ink at a lifetime of 50 milliseconds is 53 mN/m or less.

12. The ink set according to claim 1, wherein a dynamic surface tension of the pigment ink at a lifetime of 5000 milliseconds is from 28 mN/m or more to 40 mN/m or less.

13. The ink set according to claim 1, wherein the surfactant of the dye ink is polyoxyethylene alkyl ether.

14. The ink set according to claim 1, wherein a content (% by mass) of the surfactant in the dye ink is from 0.10% by mass or more to 2.0% by mass or less based on the total mass of the dye ink.

* * * * *